(12) United States Patent
Piekarski et al.

(10) Patent No.: US 10,924,641 B2
(45) Date of Patent: Feb. 16, 2021

(54) WEARABLE VIDEO CAMERA MEDALLION WITH CIRCULAR DISPLAY

(71) Applicant: Ubiquiti Inc., New York, NY (US)

(72) Inventors: Christopher Piekarski, Broomfield, CO (US); Robert J. Pera, Seattle, WA (US); Jonathan Ngai, Broomfield, CO (US); Xu Fan, Siming District (CN); Xinfu Qiu, Xiamen (CN); Jim Milner, Beaverton, OR (US); Edward Crawford, Arvada, CO (US); Tsung Hwa Yang, Taipei (TW); Yupeng Qiu, Hunan (CN); Aleksejs Vingovatovs, Riga (LV); Te-Ho Chen, Taipei (TW); James Krause, Astoria, NY (US)

(73) Assignee: Ubiquiti Inc., New York, NY (US)

(*) Notice: Subject to any disclaimer, the term of this patent is extended or adjusted under 35 U.S.C. 154(b) by 0 days.

(21) Appl. No.: 16/031,745

(22) Filed: Jul. 10, 2018

(65) Prior Publication Data

US 2019/0014242 A1 Jan. 10, 2019

Related U.S. Application Data

(60) Provisional application No. 62/530,736, filed on Jul. 10, 2017.

(51) Int. Cl.
*H04N 5/225* (2006.01)
*G06F 1/16* (2006.01)
*G06F 3/0488* (2013.01)

(52) U.S. Cl.
CPC ........... *H04N 5/2252* (2013.01); *G06F 1/163* (2013.01); *G06F 1/1605* (2013.01); *G06F 1/1626* (2013.01); *G06F 1/1686* (2013.01); *G06F 3/0488* (2013.01); *G06F 3/04883* (2013.01); *H04N 5/2257* (2013.01)

(58) Field of Classification Search
CPC ...... G06F 1/163; G06F 1/1605; G06F 1/1626; G06F 1/1686; G06F 3/0488; G06F 3/04883; H04N 5/2252; H04N 5/2257; G09G 2310/0262; G09G 2340/04; G09G 2340/0407

See application file for complete search history.

(56) References Cited

U.S. PATENT DOCUMENTS

| | | |
|---|---|---|
| 5,131,006 A | 7/1992 | Kamerman et al. |
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |

(Continued)

FOREIGN PATENT DOCUMENTS

| | | | | |
|---|---|---|---|---|
| GB | 2516256 A | * | 1/2015 | ........... G03B 17/566 |
| WO | WO98/40990 A1 | | 9/1998 | |

(Continued)

*Primary Examiner* — Chiawei Chen
(74) *Attorney, Agent, or Firm* — Shay Glenn LLP

(57) ABSTRACT

Video recording and/or streaming apparatuses (e.g., devices, systems, etc.) and methods of recording and/or streaming video. In particular, described herein are video recording and/or streaming medallion devices. These apparatuses may be worn, for example around a user's neck, and may therefore include a lanyard. Alternatively or additionally, these apparatuses may be handheld.

9 Claims, 27 Drawing Sheets

(56) References Cited

U.S. PATENT DOCUMENTS

| | | |
|---|---|---|
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |
| 5,740,366 A | 4/1998 | Mahany et al. |
| 5,844,893 A | 12/1998 | Gollnick et al. |
| 5,936,542 A | 8/1999 | Kleinrock et al. |
| 5,940,771 A | 8/1999 | Gollnick et al. |
| 6,130,892 A | 10/2000 | Short et al. |
| 6,194,992 B1 | 2/2001 | Short et al. |
| 6,337,990 B1 | 1/2002 | Koshino |
| 6,374,311 B1 | 4/2002 | Mahany et al. |
| 6,563,786 B1 | 5/2003 | Nee |
| 6,636,894 B1 | 10/2003 | Short et al. |
| 6,665,536 B1 | 12/2003 | Mahany |
| 6,697,415 B1 | 2/2004 | Mahany |
| 6,711,785 B1 * | 3/2004 | Hicks .............. A44B 11/006 24/3.1 |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,088,727 B1 | 8/2006 | Short et al. |
| 7,117,526 B1 | 10/2006 | Short |
| 7,194,554 B1 | 3/2007 | Short et al. |
| 7,197,556 B1 | 3/2007 | Short et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,483,188 B2 | 7/2013 | Walton et al. |
| 8,593,570 B2 * | 11/2013 | Boland .............. H04N 5/23203 348/376 |
| 9,247,787 B2 * | 2/2016 | Dering ................ A45F 5/00 |
| 9,503,628 B1 | 11/2016 | Alsalamah |
| 9,743,125 B2 * | 8/2017 | Brand ................ G11B 27/034 |
| 2003/0095338 A1 * | 5/2003 | Singh .................. G02B 13/06 359/725 |
| 2005/0199661 A1 * | 9/2005 | Johnson ................ A45F 3/14 224/257 |
| 2009/0021532 A1 * | 1/2009 | Gloege ................ H04N 7/0122 345/647 |
| 2009/0142043 A1 * | 6/2009 | Fujinami .............. G11B 27/105 386/248 |
| 2010/0097393 A1 * | 4/2010 | Yoneno .................... G09G 5/14 345/600 |
| 2010/0118158 A1 * | 5/2010 | Boland .............. H04N 5/23203 348/211.2 |
| 2010/0199232 A1 * | 8/2010 | Mistry .................... G06F 1/163 715/863 |
| 2011/0068999 A1 * | 3/2011 | Street ........................ G09G 3/20 345/55 |
| 2012/0092460 A1 * | 4/2012 | Mahoney ........... G06K 9/00664 348/46 |
| 2012/0273541 A1 * | 11/2012 | Zwach .................... A45C 11/00 224/615 |
| 2014/0204245 A1 | 7/2014 | Wexler et al. |
| 2014/0354880 A1 * | 12/2014 | Han ...................... H04N 5/2252 348/376 |
| 2015/0130839 A1 * | 5/2015 | Kasahara .............. G06F 3/0304 345/633 |
| 2015/0237493 A1 * | 8/2015 | Won ........................ H04W 4/80 715/734 |
| 2015/0289634 A1 * | 10/2015 | Chavez .................... A45F 5/004 224/162 |
| 2016/0027063 A1 * | 1/2016 | Wexler ................ H04N 5/2259 705/14.66 |
| 2016/0197636 A1 * | 7/2016 | Brand .................. H04B 1/3888 455/575.8 |
| 2016/0234362 A1 * | 8/2016 | Moon ................. H04M 1/0266 |
| 2016/0360088 A1 * | 12/2016 | Tanabiki ............ H04N 5/23206 |
| 2016/0360160 A1 * | 12/2016 | Eizenberg .......... G06Q 30/0207 |
| 2017/0032787 A1 * | 2/2017 | Dayal .................... A61H 3/061 |
| 2017/0052561 A1 * | 2/2017 | Proksch ............. H04M 1/72555 |
| 2017/0090512 A1 | 3/2017 | Seok et al. |
| 2017/0119118 A1 * | 5/2017 | Williams .................. A45F 5/00 |
| 2017/0251793 A1 * | 9/2017 | Barratt ................. F16M 11/041 |
| 2018/0045983 A1 * | 2/2018 | Kim ........................ G02F 1/29 |
| 2018/0090091 A1 * | 3/2018 | Sim ........................ G09G 3/3266 |
| 2018/0131869 A1 * | 5/2018 | Kim ...................... G06K 9/00288 |
| 2018/0198988 A1 * | 7/2018 | Suo ........................ G03B 7/091 |
| 2018/0314323 A1 * | 11/2018 | Mikhailov .............. G06F 3/012 |

FOREIGN PATENT DOCUMENTS

| | | | |
|---|---|---|---|
| WO | WO01/31855 A2 | 5/2001 | |
| WO | WO01/31886 A2 | 5/2001 | |
| WO | WO01/86877 A2 | 11/2001 | |
| WO | WO-2004026069 A1 * | 4/2004 | .............. A45F 5/00 |
| WO | WO2008/042804 A2 | 4/2008 | |
| WO | WO2011/005710 A2 | 1/2011 | |

\* cited by examiner

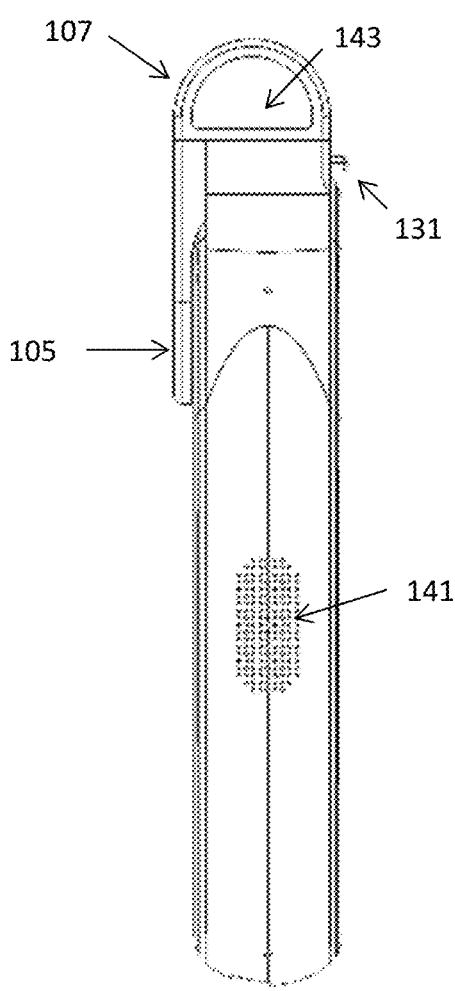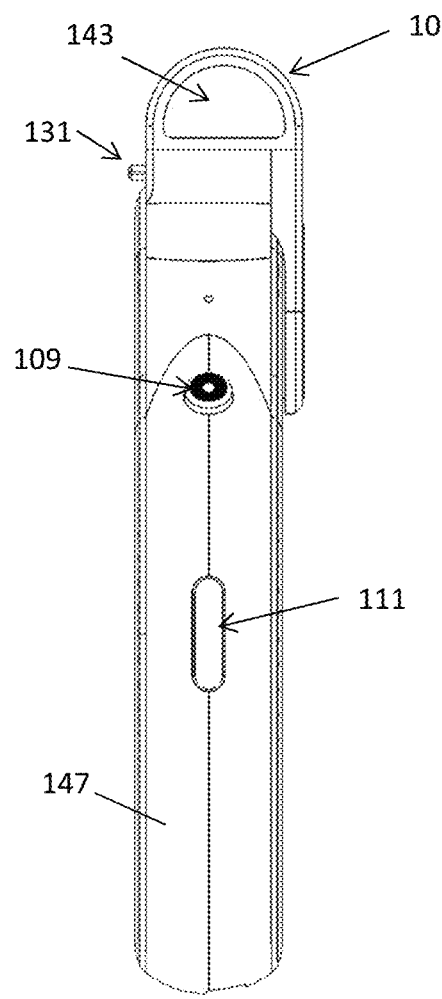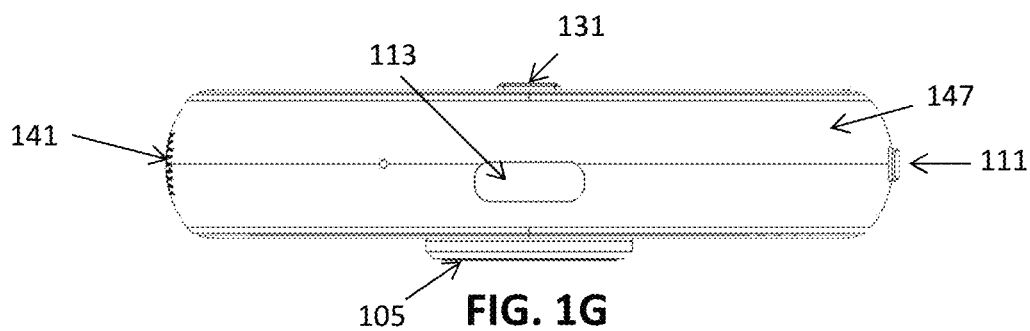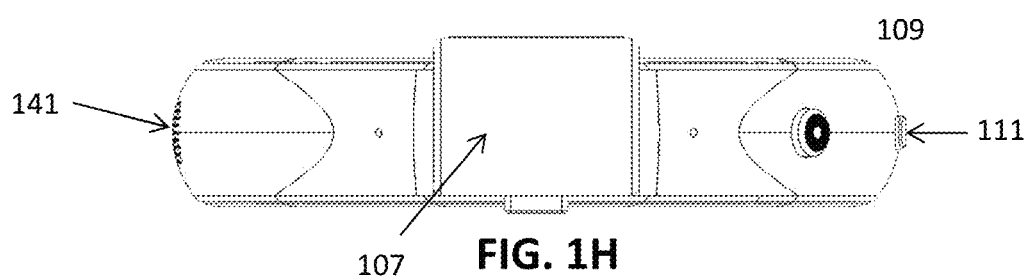

FIG. 4A  FIG. 4B
 
FIG. 5  FIG. 6

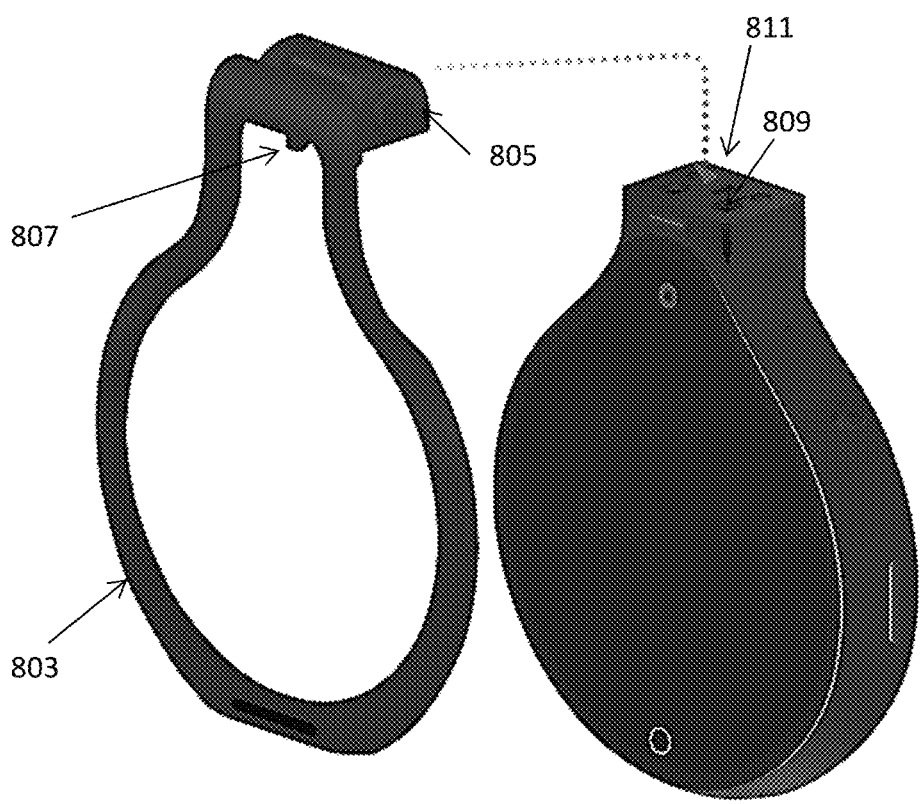
FIG. 8A
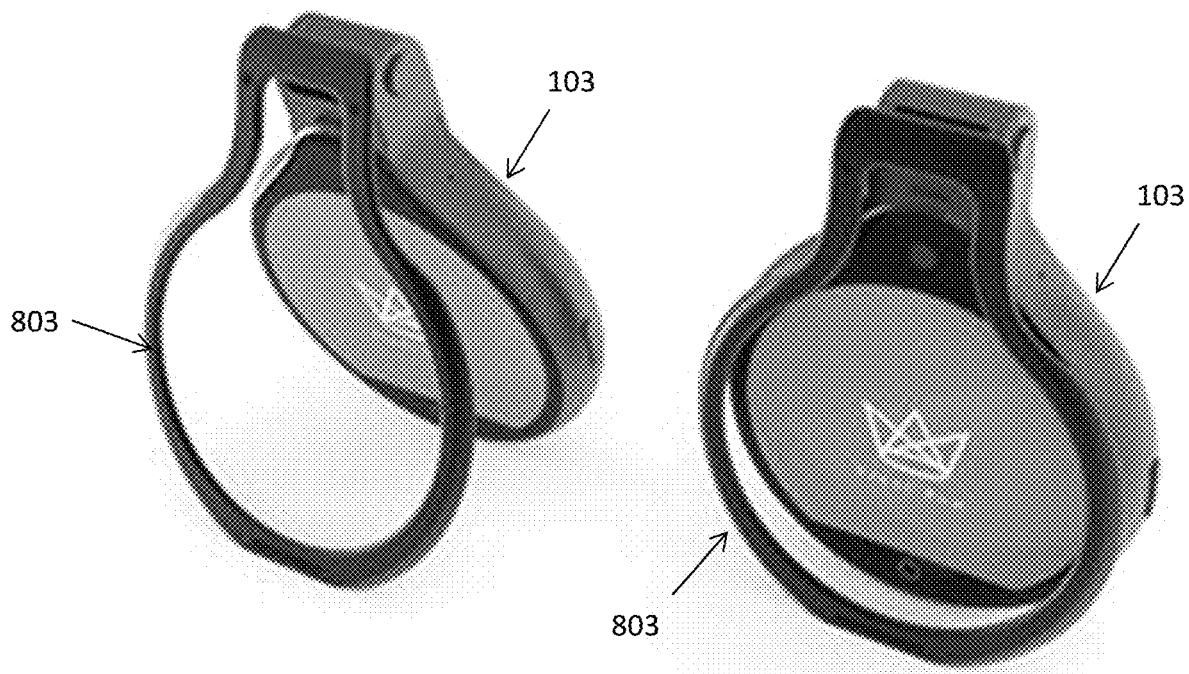
FIG. 8B   FIG. 8C

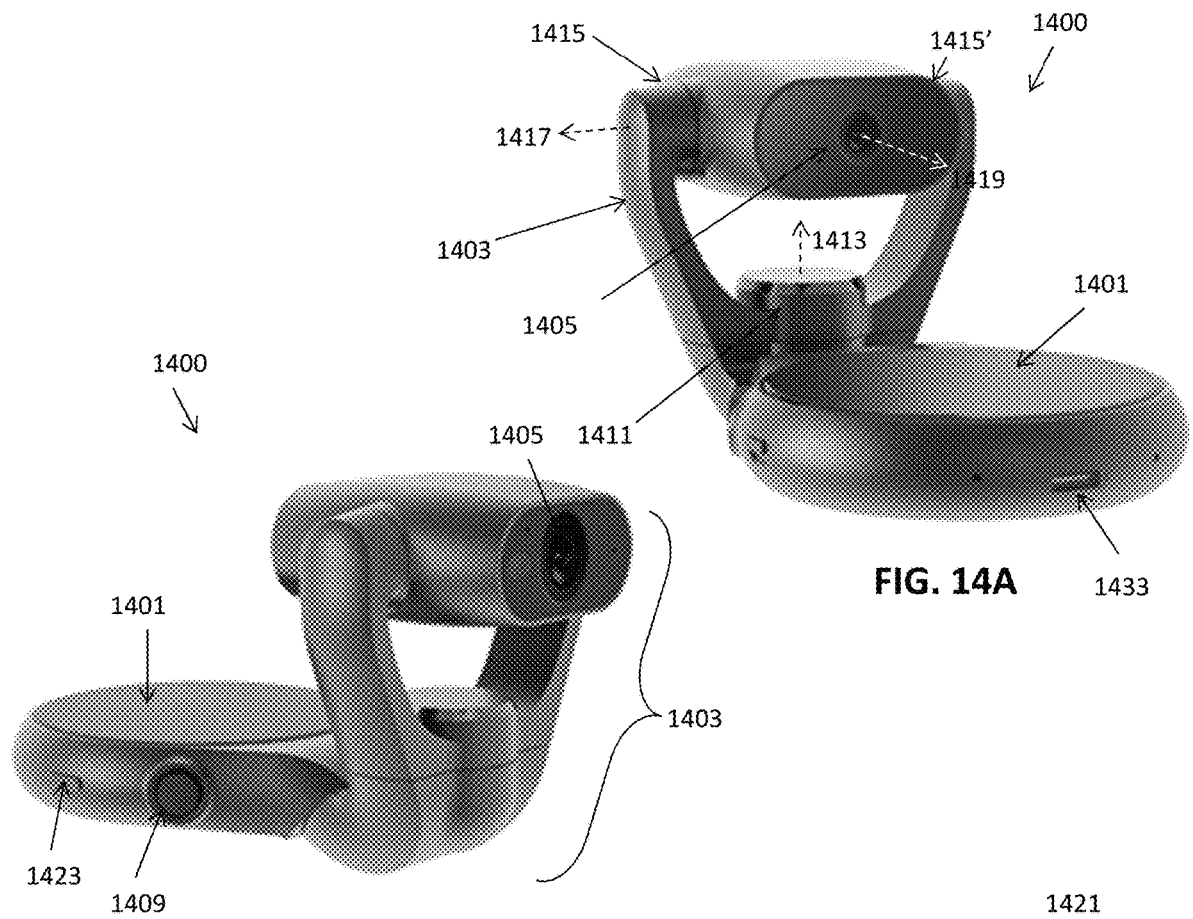
FIG. 14B
FIG. 14C
FIG. 14D

Tripod

Desk mount

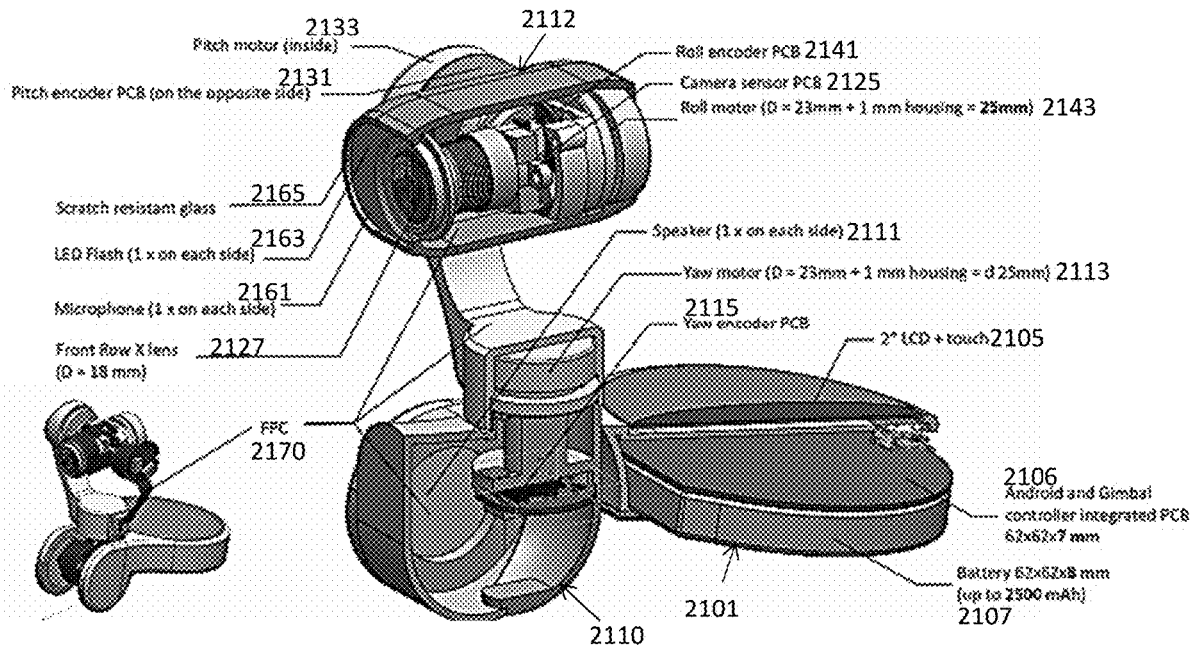
FIG. 21A  FIG. 21B
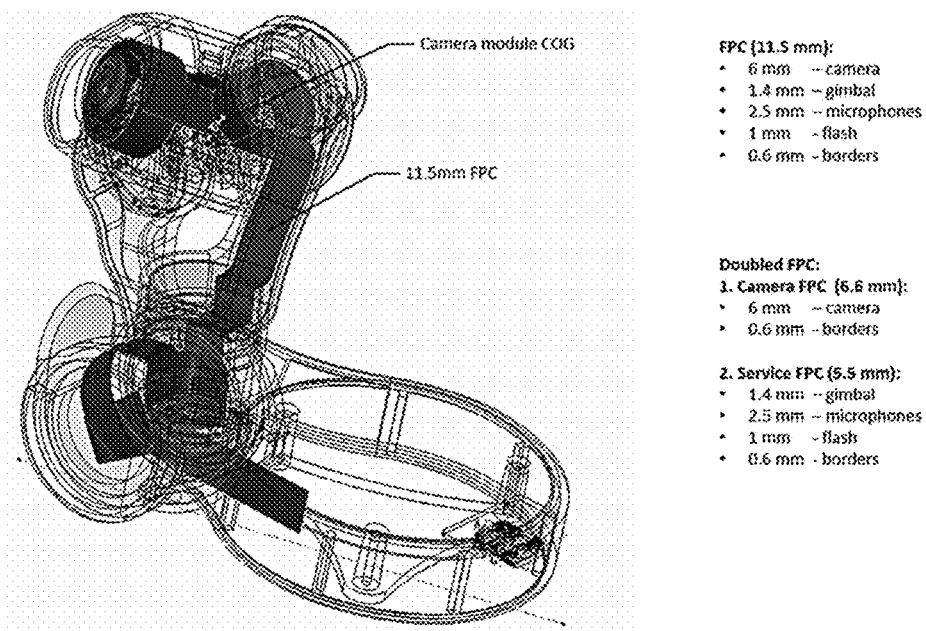
FIG. 22

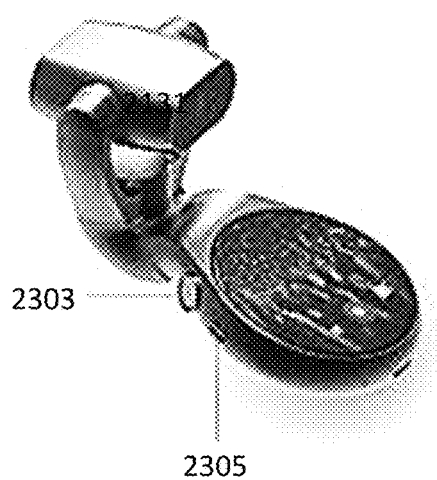
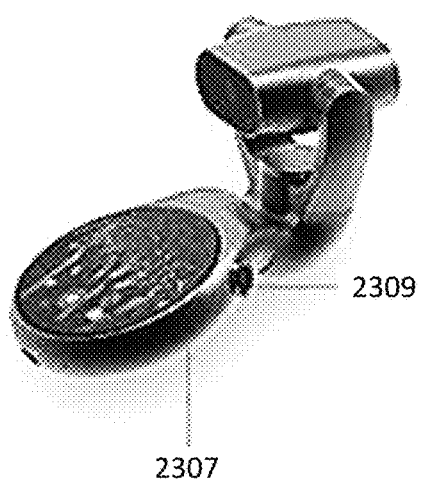
FIG. 23A  FIG. 23B
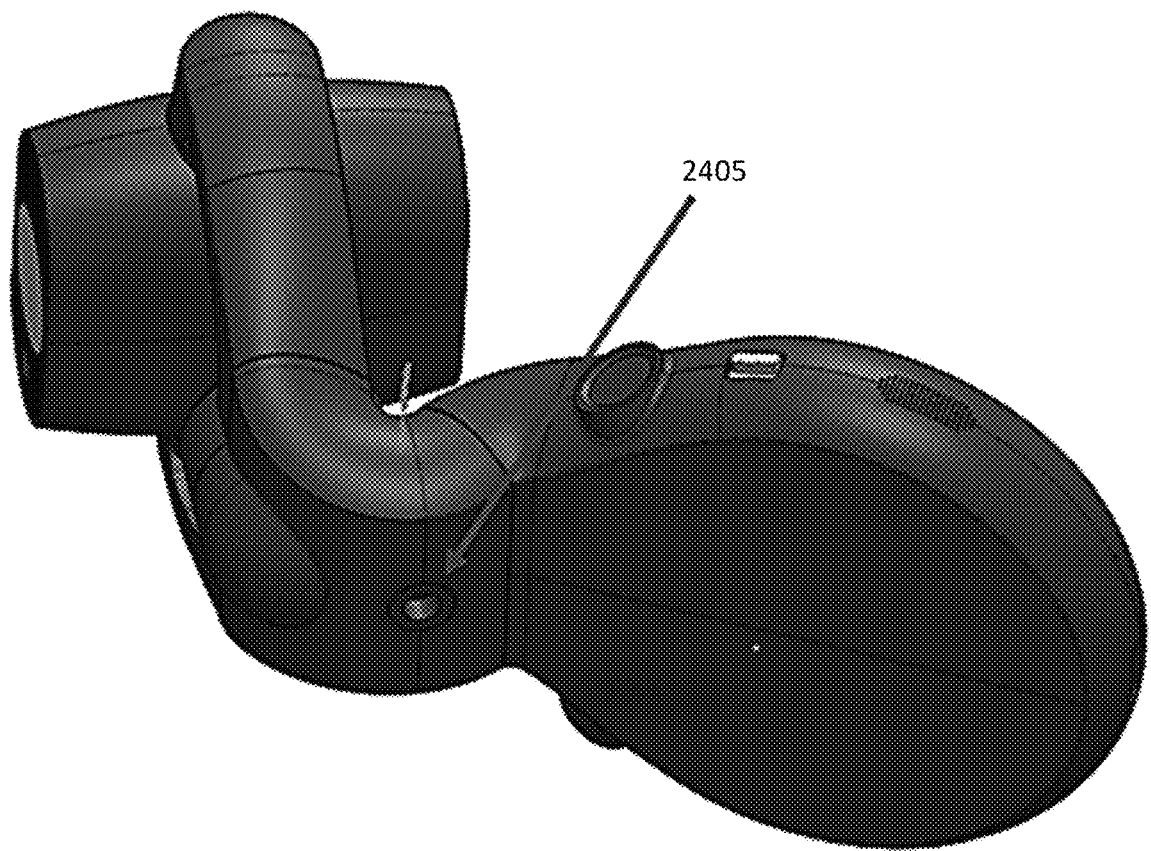
FIG. 24

| | |
|---|---|
| Dimensions | 59.8 x 70.3 x 12.1 mm (2.354 x 2.768 x 0.476") |
| Weight | 55 g (1.94 oz) |
| Memory Information | 16 GB |
| Connectivity | USB 3.0/2.0 Type C, 802.11b/g/n/ac, Bluetooth 4.1 LE, GPS |
| Sensor | Front IMX179 (8M) / Rear S5K5E2YA (5M) |
| Lens | Front F2.0 / Rear F2.0 |
| View Angle | Front 147.5° / Rear 85° |
| Video Compression | 4K @ 30 fps, 1080p @ 60 Hz, H.264, H.265, VP8 |
| Resolution | 1080p (1920 x 1080) |
| Maximum Frame Rate | 30 fps |
| Microphone | Stereo |
| Speaker | Mono |
| Management Interface | Touchscreen UI |
| Display | 1.96-inch LTPS Round, 640 x 520, 326.5 ppi, G+F Virtual Multi-Touch, Full Color |
| Max. Power Consumption | 6W |
| Power Method | USB (5V, 3A) |

WEARABLE VIDEO CAMERA MEDALLION WITH CIRCULAR DISPLAY

CROSS REFERENCE TO RELATED APPLICATIONS

This patent application claims priority to U.S. Provisional Patent Application No. 62/530,736, filed on Jul. 10, 2017, titled "WEARABLE VIDEO CAMERA MEDALLION WITH CIRCULAR DISPLAY," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure generally relates to electronic devices having video recording and display capabilities.

BACKGROUND

Mobile electronic devices provide a user with access to computing capabilities, including video recording and display, even as the user moves about various locations. Examples of mobile electronic devices include mobile phones, media players, laptops, tablets, PDAs, or hybrid devices that include functionality of multiple devices of this type.

Mobile electronic devices may be part of a communication network such as a local area network, wide area network, cellular network, the Internet, or any other suitable network. A mobile electronic device may use a communication network to communicate with other electronic devices, for example, to access remotely-stored data, access remote processing power, access remote displays, provide locally-stored data, provide local processing power, or provide access to local displays.

In particular, these devices may be used to record images (video, still images, etc.) and display them and/or communicate wirelessly with one or more remote servers, including social media and networking platforms. For example, such devices may provide communication paths and links to servers, which may host applications, content, and services that may be accessed or utilized by users via the mobile electronic device. The content may include text, video data, audio data, user settings or other types of data. Networks may use any suitable communication protocol or technology to facilitate communication between mobile electronic devices, such as, for example, BLUETOOTH, IEEE WI-FI (e.g., 802.11a/b/g/n/ac), and/or TCP/IP.

Typically such devices are not optimized for taking and displaying images.

SUMMARY OF THE DISCLOSURE

Described herein are apparatuses and methods for recording images (including video) and/or audio, and for displaying/replaying the recorded images, communicating with one or more remote devices including remote servers. In particular, described herein are are wearable, first-person cameras that are particularly well adapted for live streaming of video to one or more social media networks. Video and/or audio can be recorded and saved on the device.

Wearable devices are described herein. Devices may be pendant-shaped (e.g., having a flattened and rounded or tear-drop shape that may and may be worn on (e.g., around) a subject's neck and/or clipped onto the body, including clothing worn on the body. Functionally, any of the devices described herein may be adapted for live streaming of video to a remote server, e.g., for live steaming to a social media website (such as FACEBOOK, SNAPCHAT, YOUTUBE, etc.).

The device may be worn as a pendant, having a circular or tear-drop shaped profile with a flattened thickness. The device may have a thickness of between 0.5 cm and 5 cm (e.g., between 0.5 cm and 3 cm, between 0.5 cm and 2 cm) and a diameter of between 4 and 10 cm (e.g., between 4 and 9 cm, between 4 cm and 8 cm, between 4 cm and 7 cm, etc.), and a height of between 4 cm and 12 cm (e.g., between 4 cm and 11 cm, between 4 cm and 10 cm, between 4 cm and 9 cm, between 4 cm and 8 cm, etc.). One or both sides of the device may include a touch-screen display. The display may be circular or oval. One or both sides may include a camera. In particular, the device may include a camera on a side that is opposite from the side having the rounded (e.g., circular, a truncated circle that is flat on one side, etc.), and is configured to be worn with the camera facing outwards and the screen facing the body of the wearer.

The device may include a necklace portion attached or removable attached to a top region of the device. For example, the device may include an upper attachment portion that releasably secures the body of the device (including the camera and touchscreen(s)) to a threaded passage containing or configured to contain a necklace portion (e.g., string, chain, wire, torque, etc.). This upper attachment portion may be configured to connect with other attachments, including a stand or mount.

In any of these apparatuses, the attachment may be a clip that releasable holds the necklace portion (or "lanyard portion") to the body of the device. This attachment (e.g., clip) may be releasable by releasing a lock. For example, the releasable upper attachment portion may be disengaged by pushing a button or otherwise actively engaging a control to separate the body of the device from the lanyard portion. The releasable attachment may include multiple connectors (e.g., hooks) for securing the body to the device to the upper attachment portion.

In operation, the apparatus is configured to operate with an operating system via touch-screen user interface; one or more additional buttons on the front, back and/or sides of the device may also be used to control the apparatus. The apparatus may operate the camera concurrently while running one or more software applications. The user interface may operate via the touchscreen, and the device may interface with the touchscreen via a virtual screen. The application software and/or firmware on the phone may operate in this virtual space and a second or more additional devices (e.g., smartphones, pads, additional device such as those described herein) may communicate and/or connect wireless with the device virtual space (e.g., via WIFI, etc.). The device may connect via a virtual frame buffer. This may permit multiple "apps" (e.g., application software) to run simultaneously on the device, which may in turn communicate with the imaging/video (including audio). This allows a user to operate an app and adjust one or more apps which are all operating concurrently, through the virtual space of the device.

The display may be circular, and present on the back of the device (e.g., the device side configured to be worn against the body); the camera (camera sensor) may be on an opposite, front side (e.g., the device side configured to be worn facing away from the body). In operation, the device may execute Launcher software and/or firmware displaying a user interface for engaging with the virtual space. The rounded (oval, round, truncated circle, etc.) display/touchscreen may be configured to adapt, via a rounded-to-rectangular frame buffer that convers rectangular output/displays/user interfaces used by most software (including "apps") for display on the rounded touchscreens described herein. Thus, these devices may work a rectangular frame by adapting or truncating rectangular output displays to conform to the device's rounded display. The virtual frame buffer may adapt the otherwise "square" displays for common apps, including social media apps, for display and interaction on the rounded touchscreen. For example, upon launching (starting) the device, it may adjust the otherwise square/rectangular display for display on the rounded screen.

The devices described herein may include a second frame buffer as part of the device. The second frame buffer may be used. For example, the device may include a primary frame buffer operating a virtual frame buffer for translating between the user interface and one or more applications (software) and/or the video (imaging and/or audio) display and control, including adapting rectangular displays to the circular touchscreen display/control. A secondary frame buffer may be configured as a rectangular frame buffer that acts as a virtual mirror of the device on one or more additional devices, such as a smartphone. Thus, the device may operate seamlessly on both the local device as well as a smartphone, table/pad, etc. that is mirroring the device. Any application that may be installed and used on the second device (e.g., smartphone) may be operated on the device, and may be viewed on either the local device or the second device. For example an app such as a social media app may be installed on the device and shown in the circular touchscreen, while simultaneously being mirrored, via the secondary frame buffer, on the second device, and can therefore be viewed and/or controlled from either device. The second frame buffer allows for the display of content that is relevant to the camera. The video input and/or input controlling the device may be used to interact with the local and mirrored application. Input from the second device may be routed though the virtual mirror (e.g., through the secondary buffer) to the device. Thus, the device is configured to handle input (e.g., control input) and/or video input from both the local device (touchscreen, camera(s), etc.) and from the second device (e.g., any cameras on the second device and/or control input (e.g., touchscreen) from the second device. The secondary buffer and the primary buffer may create a virtual space that can be used to organize and control all of this input in the local device.

The devices (including user interfaces) described herein may be particular well adapted for displaying and operating with the rounded touchscreen. For example, the battery life may be indicated by a rim, halo, arc, etc. around the periphery of the apparatus that indicates the percentage of battery life left in the device (e.g., charge), in addition, the apparatus may allow of circular touch ("swiping") by the user on the screen in order to select additional screens, applications, etc.

The apparatuses (including devices and systems) described herein may include a rechargeable battery, and may, in some variations also or alternatively include a battery pack that may be added or swapped out for the device battery. For example, a battery pack expansion may be attached over the device, and may be circular.

Also described herein are variations having slightly larger dimensions that may be mounted on a stand or mount, and/or may be handheld.

Any of the devices described herein may include tracking components that allow the device to track one or more objects, including automatically tracking. For example, a user may select an object on the screen (e.g., the touchscreen on the back of the device) for tracking, e.g., by highlighting the object(s). The device may then move the camera (including moving the entire device) automatically to track the selected object(s) so as to keep them in the frame of the camera (e.g., centered, in-focus, etc.). The object may be an animate (e.g., human, animal, etc.), moving object, or an inanimate object, and may be fixed in position relative to the environment or moving. Thus, the device may follow an object and control the angle(s) (e.g., pitch and yaw) of the camera and/or the entire device to continue to track the device. The device may use a recognition technique (such as facial recognition, when the object is a person), in order to keep the selected object in frame and/or in-focus.

For example, the apparatus may include a stand having one or more gimbals for controlling the angular position of the camera. In some variations the apparatus may move the entire device. In some variations the device is configured to track an object and keep it aligned within a particular position (e.g., center) of the screen.

As mentioned, any of these devices may include an input such as a trigger button, slider button, switch, etc. on the device, in addition to the touch-screen. Tracking may be controlled manually (e.g., by a switch or button) and/or via the user interface (software/firmware) on the touchscreen. One or more additional inputs may be used, including a hand-held controller (e.g., joystick, smartphone interface, etc.) for overriding the tracking of the device.

In any of these apparatuses, the device may include a media control (e.g., media button, etc.) allowing the user to manually control the camera and other media. For example, a media control may include a joystick that allows the user to manually override where the camera should be pointing.

In some variations, the button on the side (e.g., between the 1 o'clock and 3 o'clock position) of the device may be used to toggle or control the live video recording. For example, this button may be used to take 'bursts' of video, so that while being held, the device continuously takes video and/or photos. Engaging the button twice in quick succession (e.g., tapping it twice), may place the device into a diary mode, or may select an automatic bursting mode, in which images are taken on a frequency interval, which may be predetermined, settable or selectable. This may permit taking of time-lapse images (time lapse mode). Any of these apparatuses may also include a smart capture mode, which may also be referred to herein as "story mode". In story mode, the apparatus (devices, systems, etc.) may take one or more images at timed intervals. This series of images may be combined on the fly to create a movie (e.g., time-lapse images/time-lapse movie). This mode may automatically adjust the time interval, for example, based on movement in the image, and/or the level (e.g., brightness) of the image between images.

These devices may also include software, firmware and/or hardware for controlling the motion of the camera. The device may include stabilization and/or compensation control logic for stabilizing the camera (e.g., correcting the angle, such as pitch and yaw angles) of the camera as it is held or moved when walking while holding or wearing the device. In some variations the apparatus may adjust the output images by buffering and automatically aligning sequential images to minimize or remove changes in the imaging (movies) corresponding to movement of the device. For example, the camera may take images with pixels extending beyond the displayed images. Instead or or in addition to the mechanical adjustment of the angles (pitch and yaw, and in some cases, roll) of the device (e.g., of the camera), the device may be configured to track images between sequential frames (or groups of frames) to track features and may align the sequential images in a continuous manner, in order to eliminate or compensate for movement of the device that would otherwise result in movement (including high-frequency movements of greater than 0.1 Hz, greater than 1 Hz, greater than 5 Hz, greater than 10 Hz, etc.) or rapid movements. For example if wearing or holding the device while walking down the street, the camera, and/or the images displayed from the camera, may be kept level and stable.

As discussed above, the stabilization may be achieved by both mechanical stabilization, including the use of one or more mechanisms for changing the angle of the camera (e.g., the pitch, yaw and/or roll of the angle), such as a gimbal, as well as stabilization by processing of the resulting images (e.g., software stabilization).

In some variations, the apparatus is configured to include built-in stabilizers. For example, the device may include the camera and touch screen and built-in mechanical stabilizers. The tracking and stabilizing may be performed by the hardware, software and/or firmware, and may include a mechanical gimbal (or plurality of gimbals) that allow control of two or more angles (e.g. pitch, yaw and/or roll) of the device in order to stabilize the device. The entire device may be moved by the gimbals or just the camera portion. In some variations the camera lens may be separately movable relative to the rest of the camera. For example, the camera lens(s) may be moved by a gimbal to change the angle of the lens and/or the distance between the lens and the other portions of the camera.

In variations in which the angle of the camera may be changed by a mechanical positioner such as a gimbal, the camera angle may be automatically controlled, as mentioned above, and/or it may be manually controlled. For example the orientation of the camera may be changed remotely via communication with a second device such as a smartphone, pad, etc.

The integration of the stabilization with the rear touchscreen and the forward-facing camera is particular advantageous. The lens portion of the camera in the device may be selectively moved (in/out, angle changed, etc.) which may require less power and movement to adjust; separately the position of the entire device may also or alternatively be moved, e.g., using a mechanical positioner (e.g., gimbal).

In general, the devices described herein include a camera that provides photo/video livestreaming. As mentioned, any of these devices may be configured to take stop-motion images, e.g., automatically taking one or a burst of images (e.g., between 1 and 1000, 1 and 500, 1 and 100, 1 and 50, 1 and 10, 1 and 5, etc. images in each burst), every x seconds, where x is either pre-set, selectable, and/or user-determined.

The devices described herein may include multiple views that may be streamed. The user may toggle or select between different video streams for display or transmission to livestreaming media, including social media (e.g., FACEBOOK, SNAPCHAT, etc.). The apparatus may, e.g., in the virtual space, including multiple video streams and may allow the user to switch between them for local display and/or for streaming to a remote server (e.g., for display on social media). For example, the user may assign the device to a live stream platform and can watch a primary live stream as part of a main view (e.g., big screen) and also see or select one or more smaller screens showing alternative streams/views. The alternative views may be displayed within the larger image or adjacent to it. The user may toggle between the primary stream (on the main screen) and the smaller, secondary view(s) so that the selected secondary view becomes the primary view, while the former primary view becomes the secondary view.

The touchscreen displays on any of the devices described herein may be borderless displays. Thus, the edge of the touchscreen may be immediately adjacent to the edge of the back of the device (e.g., within a few 0.5 to 5 mm).

As mentioned above, the releasable connection between the upper attachment portion and the device body may be configured to hold the device securely together so that it does not release until the control (e.g., release button) has been activated. In addition to the upper attachment portion configured to secure to a necklace, lanyard, etc., the device may be configured to connect via the releasable connection (releasable attachment) to a variety of different accessories, including a stand or mount, a magnetic attachment, a gimballed tracking stand, etc.

Any of the devices described herein may be configured to manage the battery power to extend the charge of the battery. For example, any of these devices may include hardware, software and/or firmware for extending the battery charge. Battery charge may be extended by using the lowest possible power to perform functions including the display, sensing, camera operation and processing of data, including running one or more application software. Furthermore, the apparatus may be configured to sleep in a low-power mode that is configured to prevent a large power requirement upon reactivation ('waking up') from a sleep state.

Also described herein are methods and apparatuses for recording a time-lapse video diary. For example a method for recording a time-lapse video diary may include: activating a story mode of a wearable video capture apparatus worn by a user; presenting a user interface on the wearable video capture apparatus to receive a user-selected image capture interval; recording images at the image capture interval to form a video stream; automatically rejecting images from the video stream based on: one or more indicators of image quality and on sensed motion; and storing or transmitting the video stream. An apparatus (e.g., device, system) may include any of the feature described herein and may include one or more processors configured to execute or perform the methods described herein, including the methods of recording a time-lapse video diary.

The method may further include adjusting the image capture interval based on movement of a user-selected object within a predefined region of the field of view of the video capture apparatus, and the method may also include selecting the user-selected object within the predefined region of the field of view of the video capture apparatus.

The wearable video capture apparatus may be worn around the subject's neck.

Recording images at the image capture interval may comprise recording bursts of images at a rate (within-burst rate) that is higher than the image capture interval, wherein the bursts of images of the plurality of bursts are separated by the image capture interval. The within-burst rate may be at video rate. The within-burst rate may be, e.g., x frames/second, where x is 10, 20, 30, 32, 35, 40, 50, 60, 70, 80, 90, 100, etc.

The image capture interval may be adjusted based on optical parameter, such as, for example: light balance/color balance, blurriness, sharpness, saturation, etc. The image capture interval may be adjusted based on the motion sensor.

Automatically rejecting images from the video stream based on: one or more indicators of image quality and on sensed motion. The one or more indicators of image quality may be automatically detected from the one or more images or burst of images, e.g., based on light balance/color balance, blurriness, sharpness, saturation, etc. Images may be rejected (or may be suppressed, e.g., not taken) if the wearable device detects motion greater than a predetermined set value, such as greater than 2 Hz, 5 Hz, 10 Hz, 20 Hz, 30 Hz, 40 Hz, 50 Hz, 60 Hz, 70 Hz, 80 Hz, 90 Hz, 100 Hz, etc. (e.g., greater than the x times the image capture time, where x is 0.5, 1, 1.5, 2, 2.5, 3, 4, 5, etc.).

Any of these methods may include presenting a graphical editing user interface on the wearable video capture apparatus displaying the video stream and configured to allow the user to remove one or more images from the video stream.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1E is a right side view of the device of FIG. 1A.

FIG. 1F is a left side view of the device of FIG. 1A.

FIG. 1G is a bottom view of the device of FIG. 1A.

FIG. 1H is a top view of the device of FIG. 1A.

FIG. 4A is a front view of a video recording and streaming medallion device showing the camera, device body and releasable upper attachment portion. FIG. 4B shows a back view of the apparatus of FIG. 4A, showing the rounded touch screen (shown here as a circle with a flat bottom region.

FIG. 5 shows a video recording and streaming medallion device from the back, showing the active touch screen displaying a welcome screen.

FIG. 6 shows a video recording and streaming medallion device attached to a lanyard through the releasable upper attachment portion. The attachment portion is shown as a rope which may be worn around a user's neck.

FIG. 8A illustrates the attachment of a stand such as the one shown in FIG. 3 to the connector on the top of the device body of a video recording and streaming medallion device. The connector may be hybrid magnetic and mechanical connector as shown.

FIG. 8B shows the device coupled to the stand in a first position.

FIG. 8C shows the device coupled to the stand in a second position.

FIGS. 14A-14D illustrate another example of a video recording and streaming medallion device that includes an integrated powered frame that may move the camera in pitch and yaw (and in some variations roll) and may provide user-controlled movement and/or automatic tracking by the camera. The body of the video recording and streaming medallion device also includes a rounded touchscreen display. FIG. 14A shows a first front and bottom perspective view of the device with the camera extended and the touchscreen facing downward. In FIG. 14B is a front and top perspective view of the device of FIG. 14A. FIG. 14C shows a back side perspective view of the device of FIG. 14A with the camera (which is connected to the boy portion by the powered frame portion) folded over the body, so that the rounded touchscreen is visible. FIG. 14D shows a back bottom perspective view of the device of FIG. 14C.

FIG. 17B is a partially transparent view into the front of a body portion of a video recording and streaming medallion device having a powered frame such as the one shown in FIG. 16, showing the power control region, including the battery, microphone, data connector (USB) and the like.

FIGS. 21A and 21B show internal views of a video recording and streaming medallion device having a powered frame similar to that shown in FIGS. 14A-20B. In FIG. 21A, the device is shown with the housing for the powered frame and camera head removed, showing the internal arrangement of components, including the flexible printed circuit (FPC) connecting the camera, gimbal (powered frame), microphone, flash and display and processors.

FIG. 21B is an enlarged view in which the outer housings for the camera, powered frame and medallion body (with touchscreen) has been partially cut away. The motors and encoders for moving the powered frame in roll, pitch, and yaw, are shown.

FIG. 22 is a partially transparent view of a video recording and streaming medallion device having a powered frame. FIG. 22 highlights the routing scheme of the FPC allowing compact size and control of the device.

FIGS. 23A and 23B illustrate left and right side perspective views, respectively of a video recording and streaming medallion device having a powered frame, illustrating the optional controls. In FIG. 23A, the controls shown include a trigger button (which may control, e.g., centering of the camera, taking snapshots with the camera in "double selfie mode", locking/unlocking the device), a slider button (for toggling between object tracking mode and standard mode). In FIG. 23B the controls shown include a power button (turning on/off the entire device and/or turning on/off just the screen) and a media button/toggle (triggering full recording pause/play, diary pause/play, burst mode recording, operating as a joystick to cause powered frame to move the camera up/down/left/right).

FIG. 24 is a back perspective view of the device, showing a threaded attachment site for connecting to a stand (e.g., a tripod) and/or mount.

FIG. 28A shows user interface/control screens for the rounded touch screen when the device is operating in a "photo mode". FIG. 28B shows user interface/control screens for the rounded touch screen when the device is operating in a "video mode". FIG. 28C shows user interface/control screens for the rounded touch screen when the device is operating in a "panorama mode".

FIG. 30A shows user interface/control screens for the rounded touch screen when the device is starting live streaming. FIG. 30B shows user interface/control screens providing options for live streaming with the device. FIG. 30C shows user interface/control screens for live streaming.

FIG. 32 illustrates an example of exemplary parameters (dimensions, weight, etc.) for a video recording and streaming medallion device. These parameters are exemplary only.

DETAILED DESCRIPTION

In general, described herein are video recording and/or streaming apparatuses (e.g., devices, systems, etc.) and methods of recording and/or streaming video. In particular, described herein are video recording and/or streaming medallion devices. These apparatuses may be worn, for example around a user's neck, and may therefore include a lanyard. Alternatively or additionally, these apparatuses may be handheld.

A video recording and/or streaming apparatuses may include a medallion body having a rounded front side and back side, wherein the front side is separated from the back side by a curving sidewall. The rounded front and back sides may be circular, oval or tear-shaped. A rounded touchscreen may be present on the back side of the medallion body. The touchscreen may extend to the edges of the back side of the body. A housing may cover the medallion body (except for the touchscreen), and may enclose the circuitry for controlling and operating the apparatus. These apparatuses may include a power source (e.g., a rechargeable battery), a memory, wireless communication circuitry, one or more processors, which may be part of or included with a controller. Any of these apparatuses may also include a light/illumination source.

In some variations, the apparatus include a video camera mounted to front side of the medallion body. The video camera may be mounted directly on the front side of the medallion body, and may face away from the medallion body. Alternatively, the video camera may be mounted to the front side of the medallion body (or to a top/side portion of the medallion body) by a powered frame; the powered frame may be configured to move the video camera in pitch and yaw, and in some cases roll, relative to the medallion body.

The video recording and/or streaming apparatuses described herein may also include an upper attachment portion to which a lanyard is attached. This may allow the apparatus to be worn as a necklace. The lanyard may be a rope, wire, torque, string, or the like. Thus, the devices may be configured to be worn by placing the lanyard around a user's neck.

FIGS. 1A-8C and 10A-12B illustrate a wearable video recording and/or streaming apparatus. FIGS. 14A-26B illustrate handheld (and slightly larger) video recording and/or streaming apparatuses as described herein.

Figure 1B:
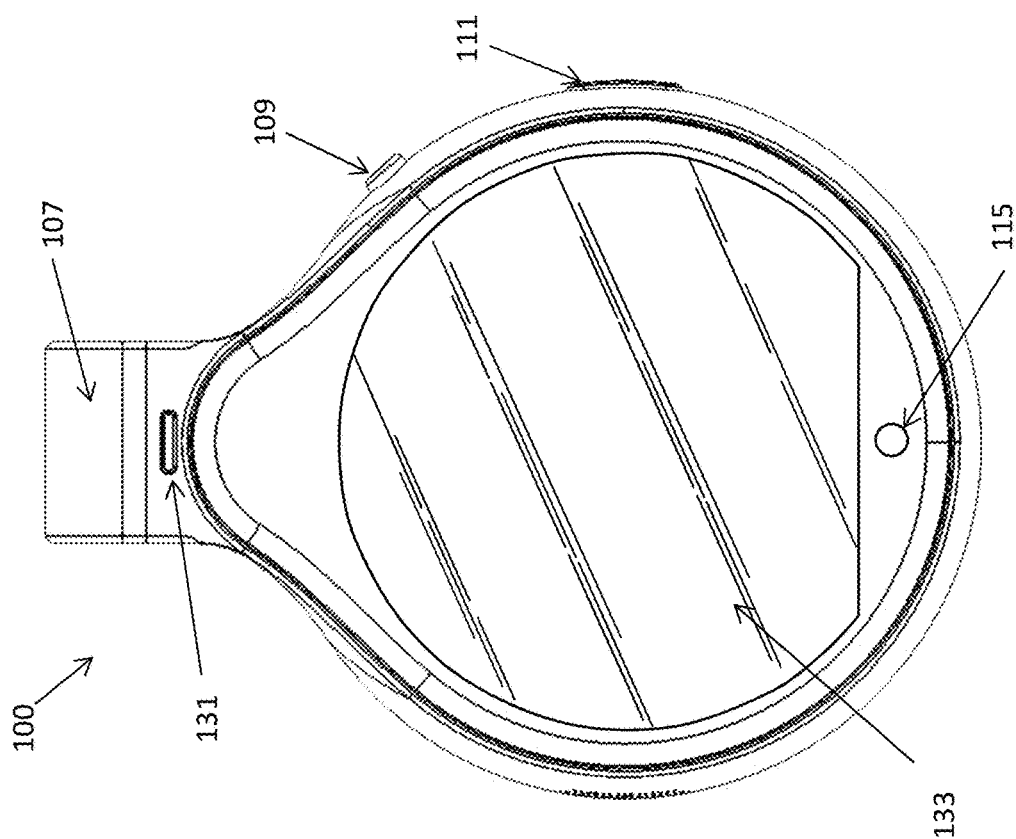
FIG. 1B is a rear view of the device of FIG. 1A, showing the rounded screen.
Figure 1A:
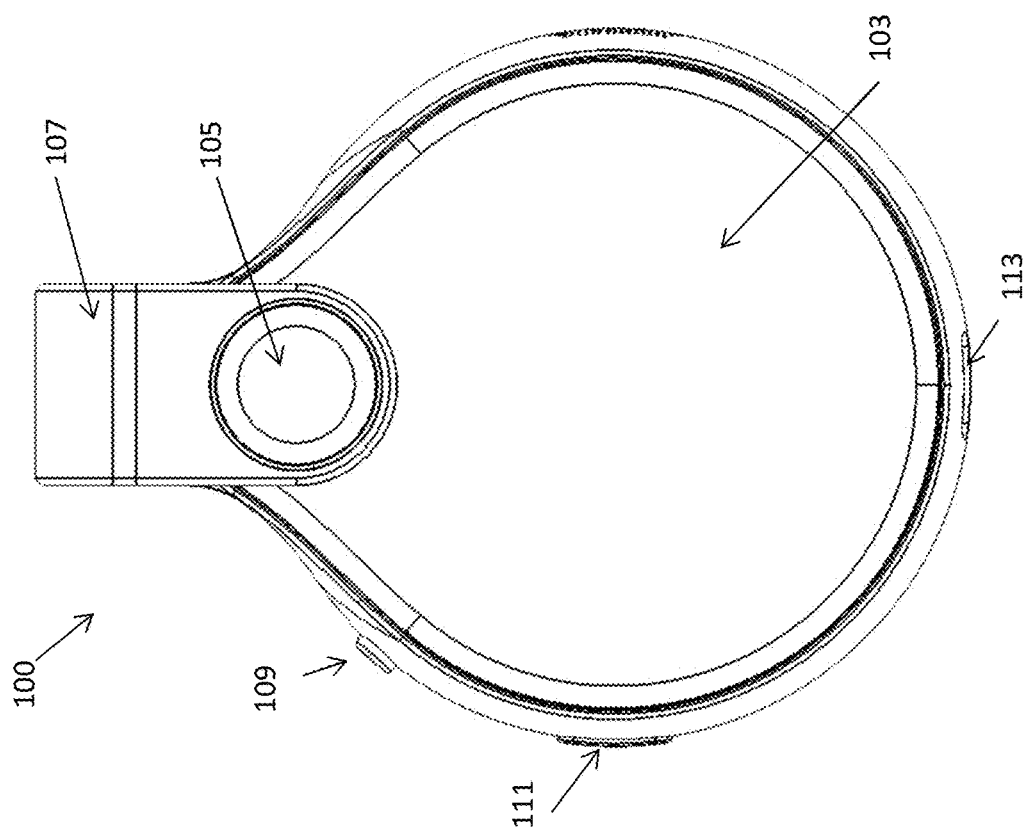
FIG. 1A is a front view of an example of a video recording and streaming medallion device that is configured to be worn.

For example, FIG. 1A shows a front of a wearable video recording and/or streaming apparatus 100 that includes a medallion body 103. The medallion body may be a shell of polymeric (e.g., plastic) material, metal, etc. A video camera 105 is mounted on the back side of the video recording and/or streaming apparatus. The video camera may be any appropriate video camera, and may include one or more lenses and video recording hardware (sensor(s)). An upper attachment portion 107 may be coupled to the top side of the medallion body. A lanyard may be attached to the upper attachment portion, e.g., through a channel or opening into which the lanyard may be threaded. Any of these devices may also include a releasable fastener (not visible) on a top side of the medallion body that secures the upper attachment portion to the medallion body. Because the device is to be worn securely around the neck, but must be readily removed from the lanyard in a controlled manner, the releasable fastener forming an attachment region 113 between the upper attachment portion 107 and the medallion body may be secured in place by a releasable lock or control. A release control 131 may be present and may be configured to be actuated to release the releasable fastener from the medallion body.

Figure 1C:
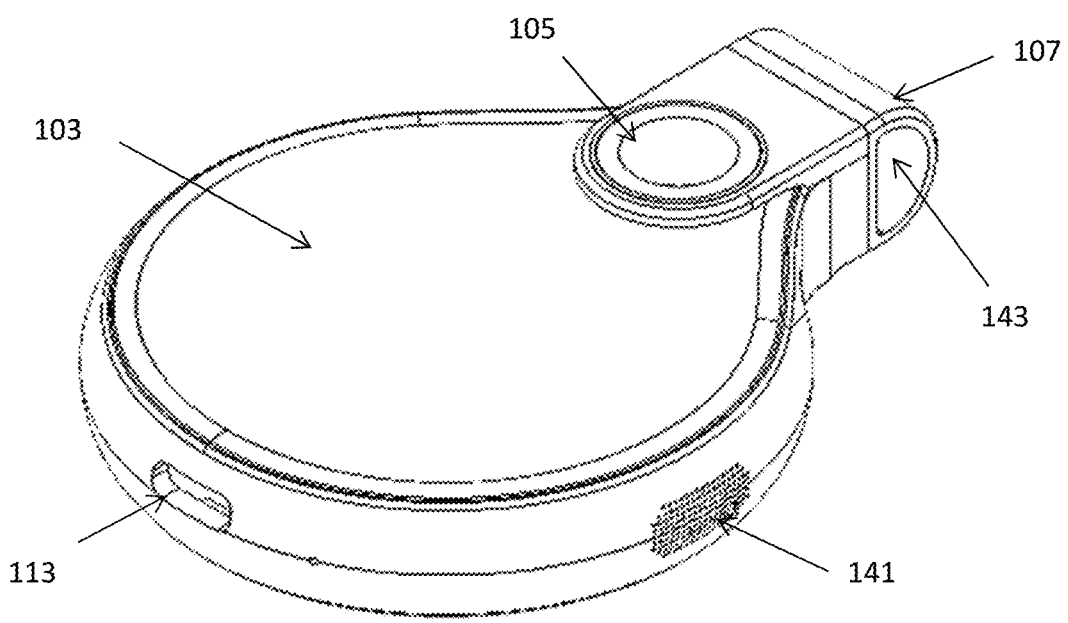
FIG. 1C is a back perspective view of the device of FIG. 1A.
Figure 1D:
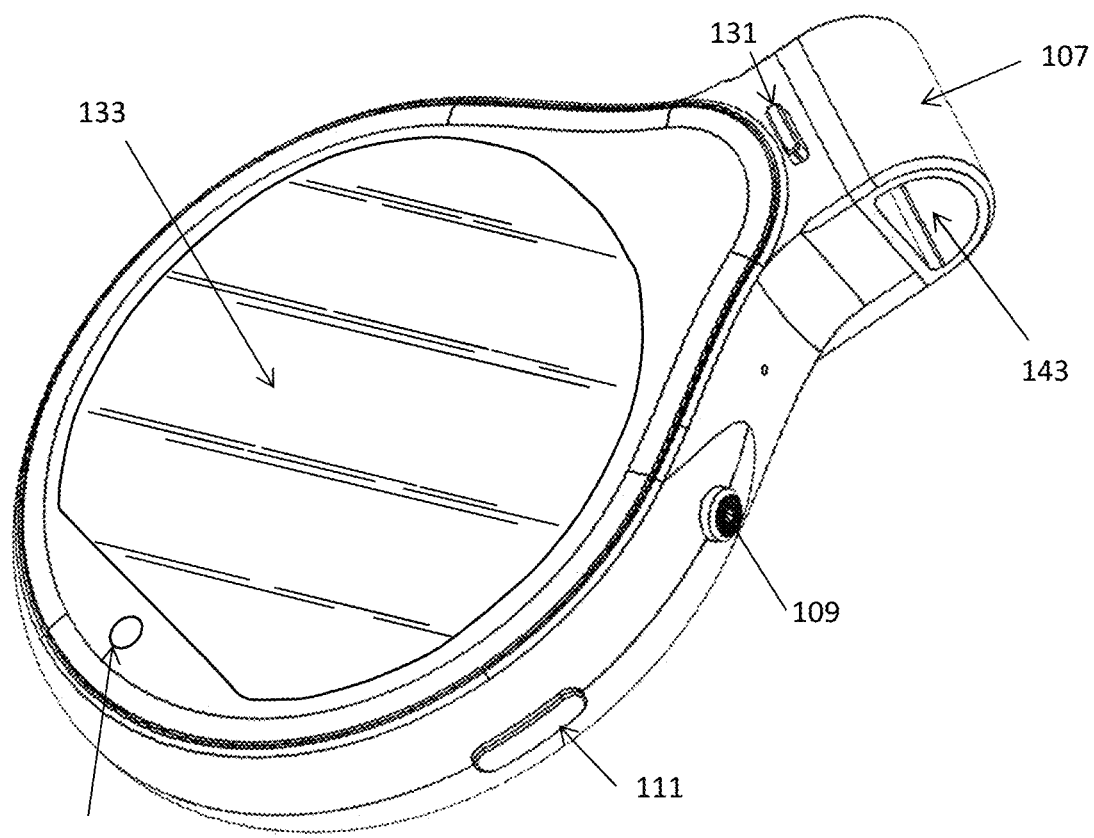
FIG. 1D is a front perspective view of the device of FIG. 1A.

FIG. 1B shows the back of the device shown in FIG. 1A. In this example the front side of the medallion body includes a rounded touch screen 133 that may be used to both display videos (e.g., the video taken by the device or replayed from this or another device) as well as a user interface for controlling the apparatus. In addition to the touch screen, additional controls (e.g., buttons, sliders, etc.) may be present on the housing of the apparatus. For example, in FIGS. 1A and 1B, the device may include a first button 109 at between the 1 o'clock and the 3 o'clock position. This button may be controlled by pushing in one or more times and/or may be pushed forward/backwards and left/right (e.g., like a finger-manipulated joystick). A side button 111 control may also or alternatively be present on the side of the device. In some variations this side button is a power (on/off) button. Alternatively or additionally, the side button 111 may be used to turn on/off just the video screen. For example, two short pushes on the side button may turn on/off the screen, while one long push may turn the device on/off. Pressing this button may be used to enter or exit a sleep mode. In some variations, pressing and holding the button 111 may access the reboot and/or power off options. One or more buttons 115 may be present on the back side, in addition to the touch screen 133. In addition, the device described herein may also include a coupling or attachment region 113, for coupling to a cable (e.g., USB cable) for charging the device, passing data, and/or receiving control information, etc. FIGS. 1C and 1D shows front and back perspective views, respectively of the device shown in FIG. 1A. In FIG. 1C, a speaker region 141 (including holes that may be used for the speaker to allow sound to pass). The upper attachment portion 109 in this example includes a passage 143 into which a lanyard may be fed so that the entire device may be worn around a user's neck.

FIGS. 1E and 1F show left and right side views, respectively, and FIGS. 1G and 1H show bottom and top views, respectively. The portion of the housing between the front side and the back side is shown in FIGS. 1E-1H (e.g., the sidewall 147 extending between the front side and the back side).

Figures 2, 3:
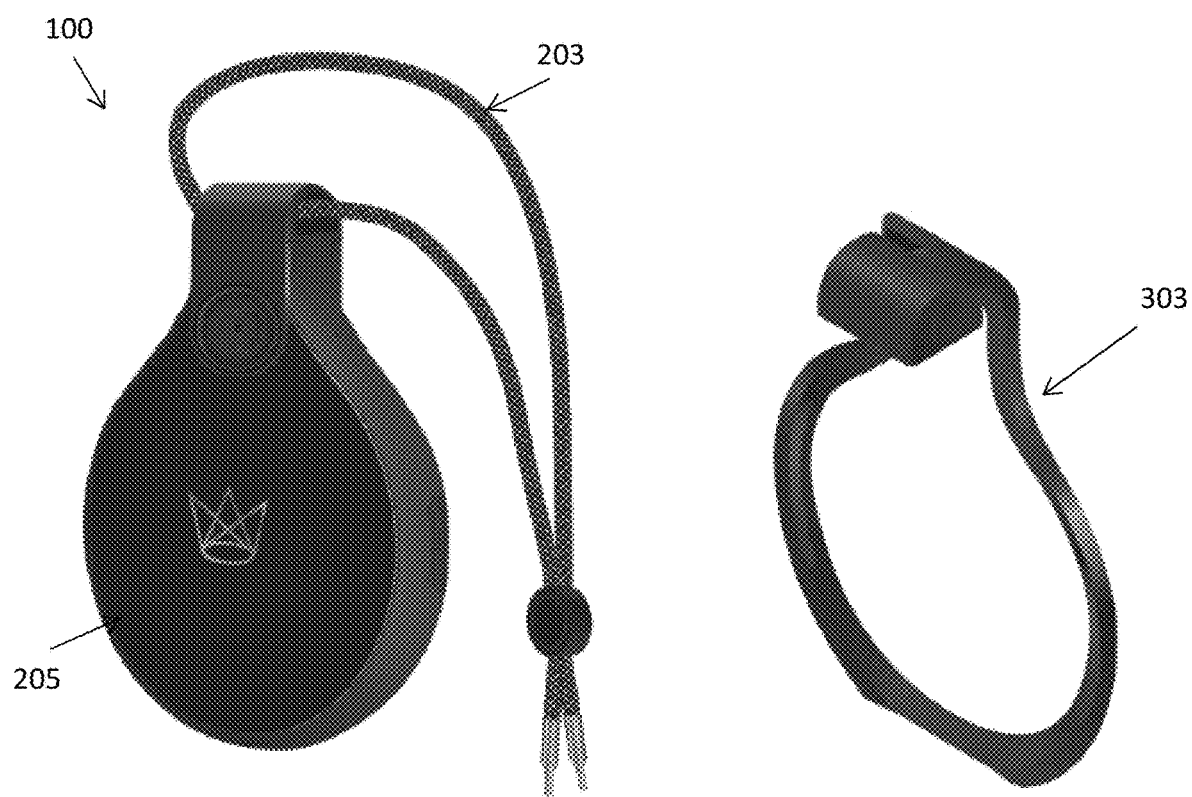
FIG. 2 is a front perspective view of an example of a video recording and streaming medallion device that is configured to be worn, including a lanyard attached to a releasable upper attachment portion.
FIG. 3 is an example of a stand that may couple to the releasable connection on the body of a video recording and streaming medallion device such as the ones shown in FIGS. 1A and 2.

As mentioned, the wearable video recording and/or streaming apparatuses described herein may be worn on a lanyard around the user's neck. FIG. 2 shows a wearable video recording and/or streaming apparatus 100 attached to a lanyard 203. The device is typically worn so that the front side 205 is facing outward, away from the users body when worn, allowing video imaging in the direction that the user if facing. The user may look at the video display (touchscreen) on the back of of the device (see, e.g., FIG. 1B) or may use the touchscreen to control the activity of the apparatus.

A mount or stand 303 may be used with any of the apparatuses described herein. For example, FIG. 3 illustrates a first example of a stand 303 configured to be releasably mounted to the top of the device. The upper attachment portion to which a lanyard is attached in FIG. 2 may be removed by releasing a releasable fastener on a top side of the medallion body securing the upper attachment portion to the medallion body. For example, in the variations shown in FIGS. 1A-1H, the upper attachment portion with the lanyard may be unlocked and released by pushing on the release control 131 (e.g., a button) to actuate release of the releasable fastener, allowing removal of the upper attachment portion 107. Once removed, the stand may be attached to the medallion body by mounting it, in the same way that the upper attachment body was attached. For example, the attachment may be a magnetic attachment, a mechanical attachment or more preferably a hybrid mechanical and magnetic attachment.

FIGS. 8A-8C illustrate attachment and operation of a stand or mount that may be used to adjustably position the wearable video recording and/or streaming apparatus. In FIG. 8A, the mount 803 (which may be referred to as a magnetic clip, and may be magnetic), may be attached to the medallion body through region on the mount 803 that corresponds to the upper attachment region 805. This upper attachment region (like the lanyard holder) may include a magnet housed within the upper attachment region and one or more (e.g., two, three, four, five, six) mechanical attachments. The mechanical attachments may be L- or J-shaped projections 807 that may engage complimentary portions 809 of the releasable fastener 809 on the medallion body. The releasable fastener is positioned in this example at the upper region of the medallion body, and may include a release control 131 that disengages and/or unlocks the mechanical attachments. Once the mount/clip 803, which is configured in this example as a frame, is attached, the frame sits against the back side of the device. The mount may be used as a stand, as shown in FIG. 8B, supporting the wearable video recording and/or streaming apparatus when placed on a surface. The angle between the mount/clip 803 and the medallion body may be adjusted. Alternatively, in some variations the mount/clip 803 may be used to clip onto an article of clothing (e.g., worn) or another structure for holding the wearable video recording and/or streaming apparatus. When doing this, the mount/clip may be adjusted so that the angle with the medallion body 103 is less than 15° (e.g., less than 12°, less than 10°, etc.) as shown in FIG. 8C. The mount/clip may form a part of the apparatus, e.g., part of a system may include a wearable video recording and/or streaming apparatus, a mount, a power/data cord (e.g., USB cable), an adapter (e.g., wall power adapter, USB adapter, etc.), etc.

Figures 10A, 10B:
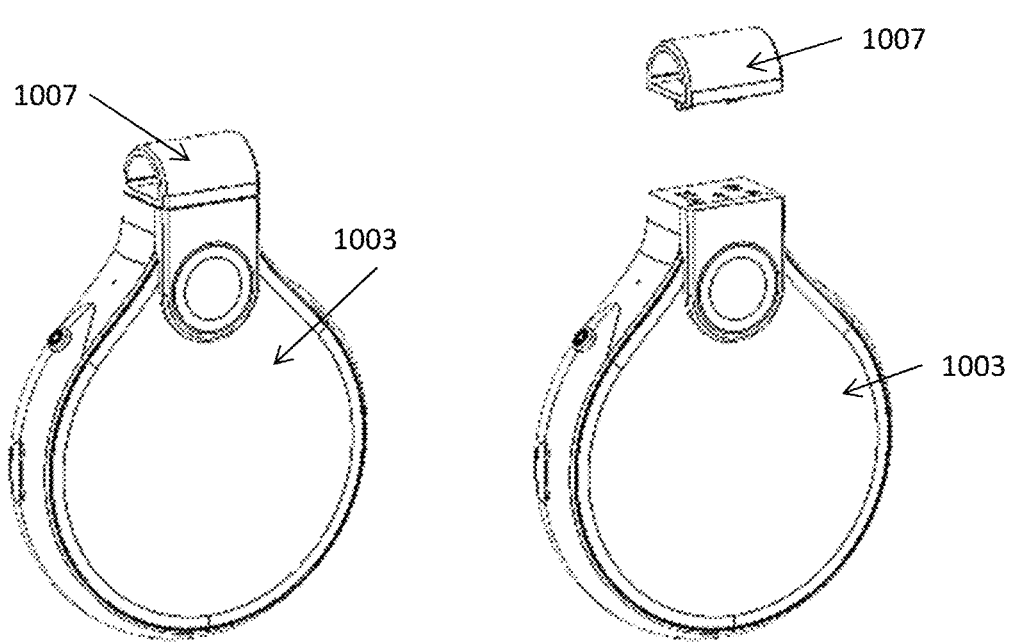
FIGS. 10A and 10B illustrate connection between the body of a video recording and streaming medallion device and an upper attachment portion. This upper attachment portion is configured to hold a lanyard so that the device may be worn around a user's neck.

The clip shown in FIGS. 3 and 8A-8C may be a magnetic clip that may also be configured to secure the device to a magnetic surface. For example, as just described, the magnetic clip may be attached by first removing the upper attachment portion 1007 from the medallion body 1003, as shown in FIGS. 10A-10B. For example, a release button may be pushed to release the upper attachment portion 1007. Returning to FIG. 8A-8C, the magnetic clip (mount) may be attached by again holding the release button while attaching the magnetic clip 803. The back of the magnetic clip may include a magnet that may then be used to secure the apparatus to any magnetic surface.

Returning now to FIG. 4A, in any of the variations described herein, the front camera 405 (video camera) may extend off of the top and/or front side of the apparatus. The front camera 405 may incorporate a fisheye lens, e.g., having a 147.5 degree viewing angle. In FIG. 4A, the video camera 405 projects slightly out of the front side of the device, although it may be flush or even recessed with the front side. In some variations the camera is attached to the medallion body through an adjustable (e.g., a powered) frame, as will be described in greater detail below. The powered frame may be used to adjust (automatically and/or manually) the angle of the camera relative to the medallion body 403. FIG. 4B illustrates the back side of a medallion body including a rounded touch screen 407. The touch screen may be completely or partially oval or round. In FIG. 4B the screen is round except for the bottom 60 degrees or so, which are connected by a flat, straight line. An optional control 1007 may be included on the back surface and may be used to interact with the touch screen 407. In FIG. 4B, the back also includes a back camera 411, which may have a lower angle viewing angle. For example, in FIG. 4B the camera includes a lens with an 85° viewing angle. In FIG. 4B, the touchscreen may comprise an adjustable, full-color display. As mentioned, the touchscreen may be used as a control. A home button 414 may also be included on the back side as shown in FIG. 4B. In FIG.

Figure 7A:
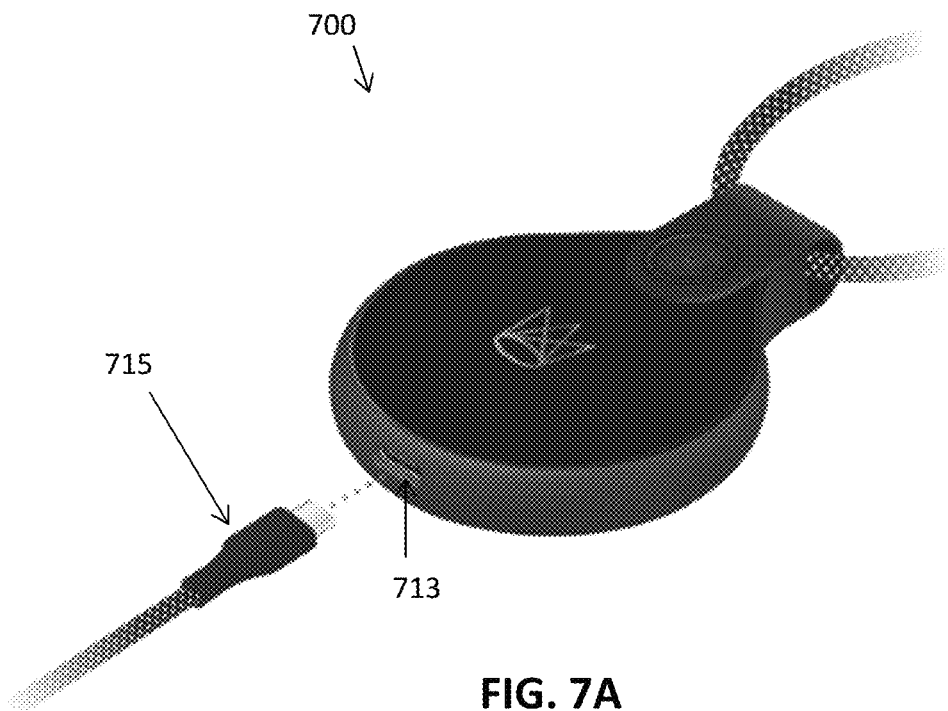
FIG. 7A illustrates connection of a cable (e.g., USB cable) to a video recording and streaming medallion device via a connection port on the bottom of the device.
Figure 7B:
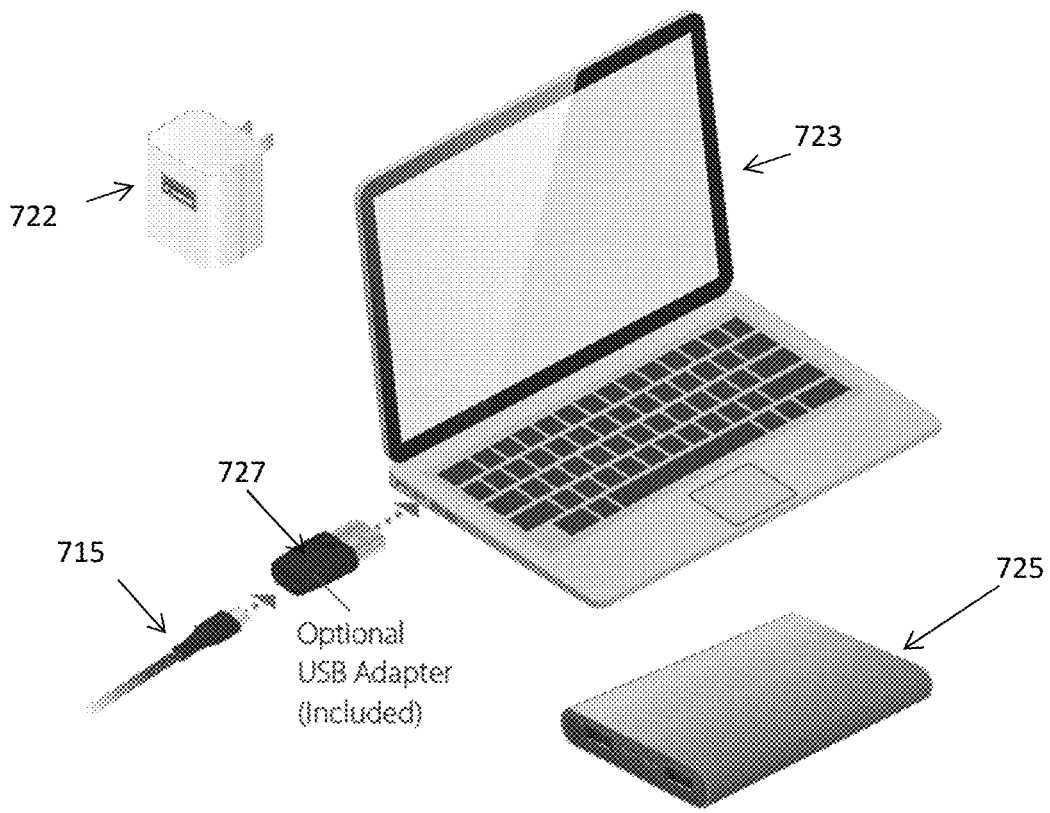
FIG. 7B illustrates connection of the video recording and streaming medallion device through the cable shown in FIG. 7A to one of a charger, a computer (e.g., directly or via a USB adapter) or a memory device (e.g., hard drive).

FIG. 5 illustrates an introductory user interface (screen) that may be presented when the device is first turned on. In any of the variations described herein, the device may be charged and/or initialized by initially connecting to a power source and/or computer via a cable (e.g., USB cable) as shown in FIG. 7A. A connector port 713 may then be connected to a cable 715, such as a USB cable. Power and/or data may be transmitted to the apparatus 700 (or data transmitted from the apparatus) using the cable 715. The other end of the USB cable may be connected to the USB port of a power adapter 722, computer 723 (and/or USB adapter 727), and/or a digital memory, and/or a power bank 725.

Figure 9A:
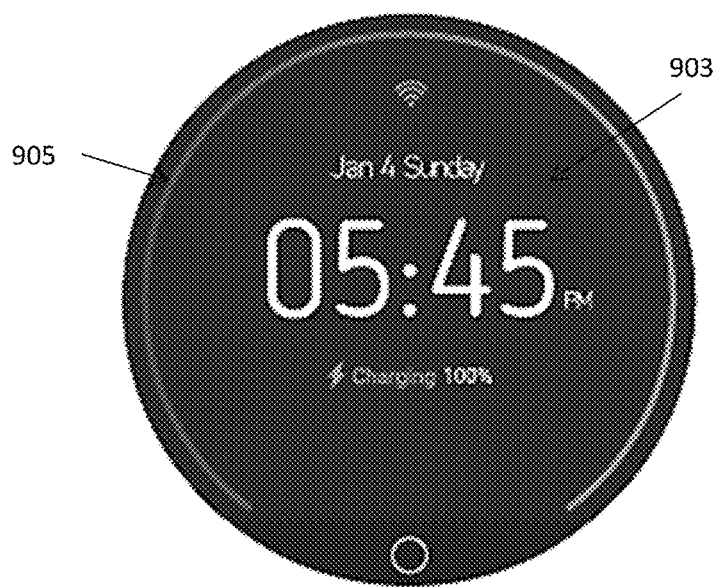
FIG. 9A illustrates a touchscreen (user interface) for one example of a video recording and streaming medallion device, showing a home screen. The battery charge is indicated by the peripheral arc around the screen (shown a full charge).
Figure 9B:
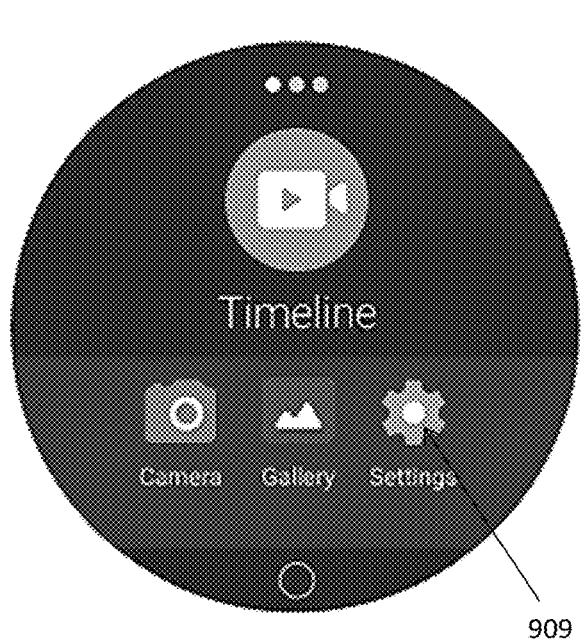
FIG. 9B illustrates a second example of a user interface screen on the rounded touchscreen of a video recording and streaming medallion device, showing a "timeline" view.

Once the device is powered (either during charging or after charging) it may be turned on (e.g., by pushing a power on button, as discussed above), and may initially show a welcome screen 503 on the rounded touchscreen, as shown in FIG. 5. Any of these apparatuses may then display an overview screen 903, as shown in FIG. 9A. The display of one or more of these screens (or in some variations, all of these screens) may be adapted to display the power level as an arc, circle, or the like. In FIG. 9A, for example, the full charge is represented by the peripheral curved line extending between the 7 o'clock and the 5 o'clock positions. As the charge is depleted, the curved line may change color and/or shrink, e.g., so that half-charge is indicated by extending between 7 o'clock and noon. In general, the screen may be 'swiped' to select different control screens. For example, swiping right on the home screen shown in FIG. 9A may access the overview user interface/screen, which includes a selection for settings 909, as shown in FIG. 9B. In FIG. 9B, the settings icon 909 may be selected by tapping on it. Other icons may be chosen by rolling the screen, e.g., by pulling to the right or left.

Figure 9C:
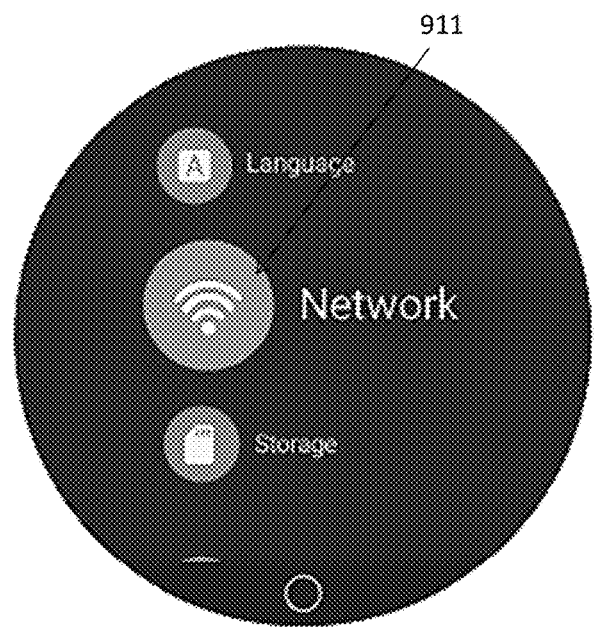
FIG. 9C is another example of a user interface screen on the rounded touchscreen of a video recording and streaming medallion device, showing options/controls for the device, including networking, language selection, storage, etc.
Figure 9D:
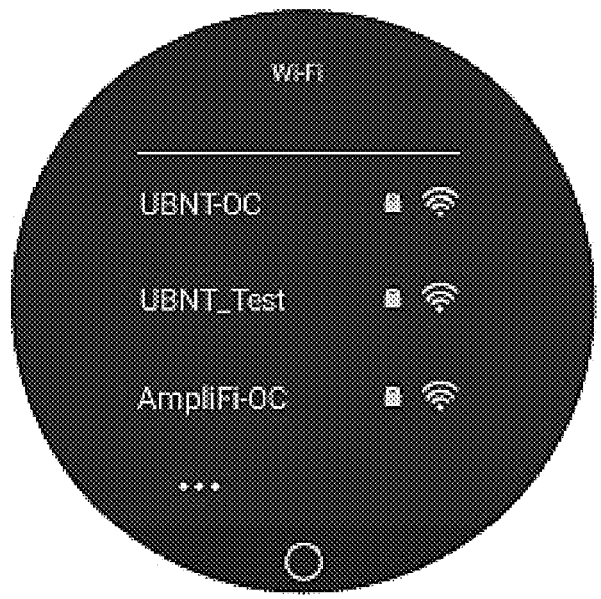
FIG. 9D is another example of a user interface screen on the rounded touchscreen of a video recording and streaming medallion device, showing networking connections (e.g., wireless networks).
Figure 9E:
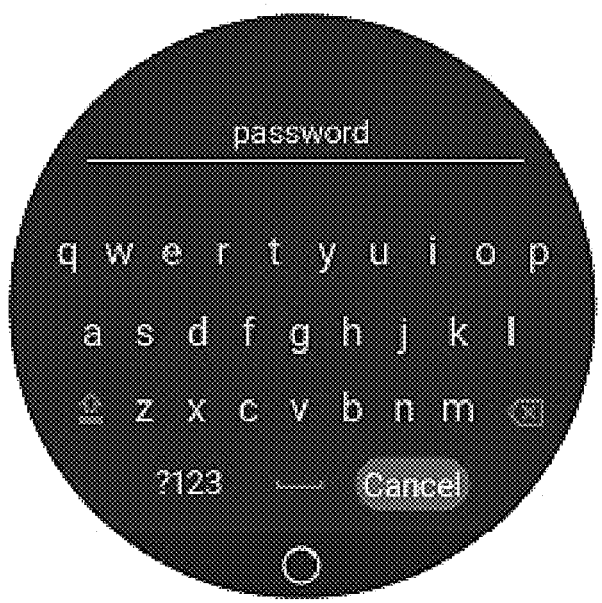
FIG. 9E is another example of a user interface screen on the rounded touchscreen of a video recording and streaming medallion device, showing a screen keyboard (qwerty) for inputting information into the device.

Once the settings icon 909 is selected a menu screen may be displayed, as shown in FIG. 9C. In this example, the various device settings may be adjusted, including the language used by the device (English, Spanish, French, etc.), managing storage, selecting the network (e.g., choosing a local network to join), etc. For example, FIGS. 9F and 9G illustrate selection of the local network after selecting the network icon 911 in FIG. 9C. In FIG. 9D the touch screen displays local networks, and one or more may be selected. A keyboard display may be used to enter data (e.g., passwords, etc.) to log into the local network.

In general, the apparatus may be used to take photographs, record video, start a video diary, and/or stream live footage.

As mentioned in reference to FIG. 9A, the overview screen 903 may display the charge 905; similarly this screen may display the wireless strength (using a similar peripheral curved line icon, or other icons representing connection strength. The overview screen may also indicate date, time, and charging battery status or the like. As mentioned, swiping from the home screen (e.g., swiping down) may display the network name, battery life, available storage capacity, speaker mode, and other setting options. Any of these indicators (e.g., battery life, available storage, etc.) may be indicated by a different colored and/or sized curved peripheral line, similar to that shown for battery charge 905 shown in FIG. 9A. Swiping right from the overview screen may access the main menu; swiping to rotate between different modes of operation, including the timeline mode, a start live/streaming and/or a movie diary mode.

Figure 11:
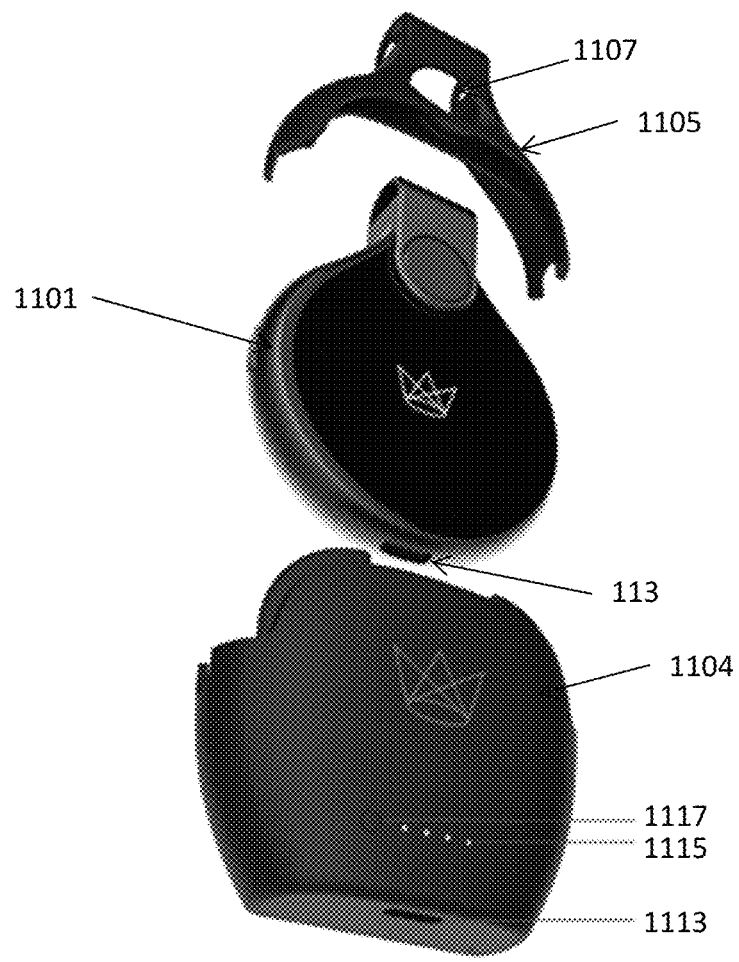
FIG. 11 illustrates a system including a video recording and streaming medallion device and case that may hold the device.

Any of the video recording and streaming medallion devices described herein may be used with a case or holder. For example, FIG. 11 show an example of a protecting case or jacket that may be used to at least partially enclose the video recording and streaming medallion device 1101, as shown. In this example, the case includes a base portion 1104 and a top portion 1105 the top portion may engage with (and releasably lock with) the base portion; thus the video recording and streaming medallion device may be secured within the case. The case may be made of a protective material, such a plastic, metal, etc. The case may include one or more openings for the camera 1107 and for the touchscreen (not visible in FIG. 11). Alternatively or additionally, the case may also include additional power that may be used to supplement or replace the power source within the video recording and streaming medallion device. For example, in FIG. 11, the base portion of the case may include additional power and may couple (e.g., plug into) the video recording and streaming medallion device via the USB port 113 to provide additional power to the video recording and streaming medallion device. In FIG. 11, the case is configured as a power extender and includes an indicator (e.g., LED lights) 1115. The case may also include a port (e.g., USB port 1113) to connect to a power source, computer, etc. for charging and/or passing data to/from a video recording and streaming medallion device that is held within the case. The port 1113 may be used to charge the battery within the case (the power extending battery), and/or may be used to provide power directly to the video recording and streaming medallion device when it is held within the case and plugged in. The case may also include one or more controls (e.g., button 1117) for controlling the operation of the case, including turning on/off power provided by the case to the video recording and streaming medallion device, and/or for opening/closing the case.

The case shown in FIG. 11 may be worn around the neck with the video recording and streaming medallion device (e.g., using the same lanyard).

The case shown in FIG. 11 is just one example of a power extender that may be used with any of the video recording and streaming medallion device; the power extender does not need to be configured as a case, but could otherwise attach to the video recording and streaming medallion device, typically connecting to a port such as the USB port, and may attach to the body of the video recording and streaming medallion device. For example, the power extender may clip or clamp on to the body of the video recording and streaming medallion device.

Figure 12A:
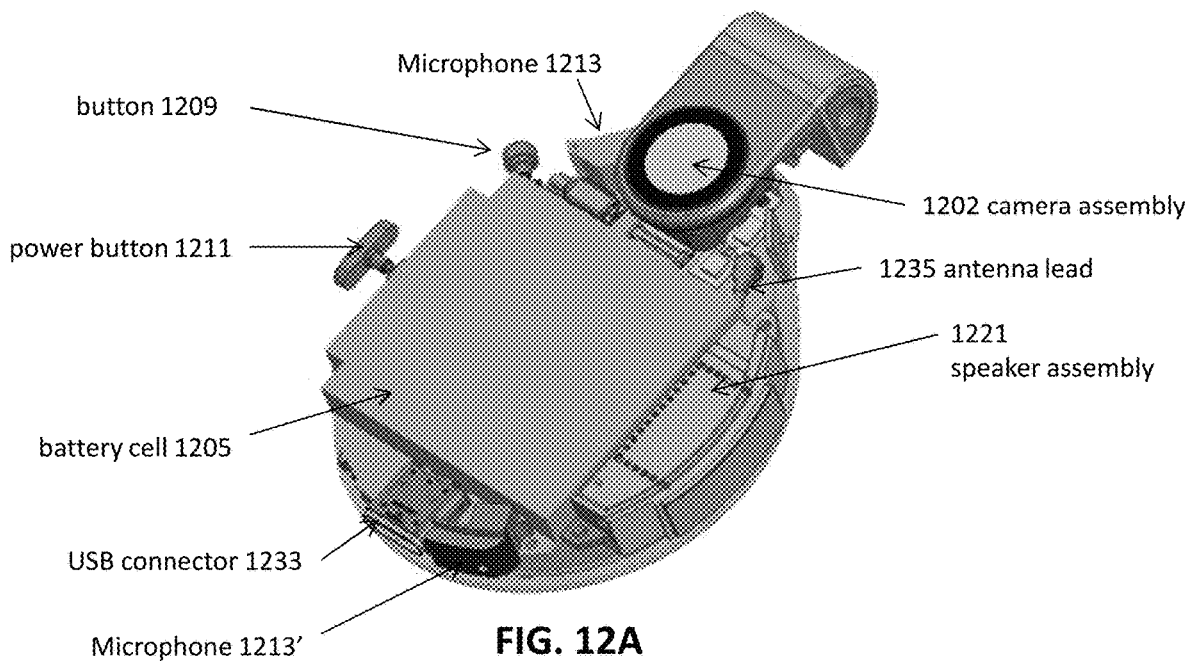
FIG. 12A is a front perspective view of a video recording and streaming medallion device with the outer housing removed, exposing the inner components.
Figure 12B:
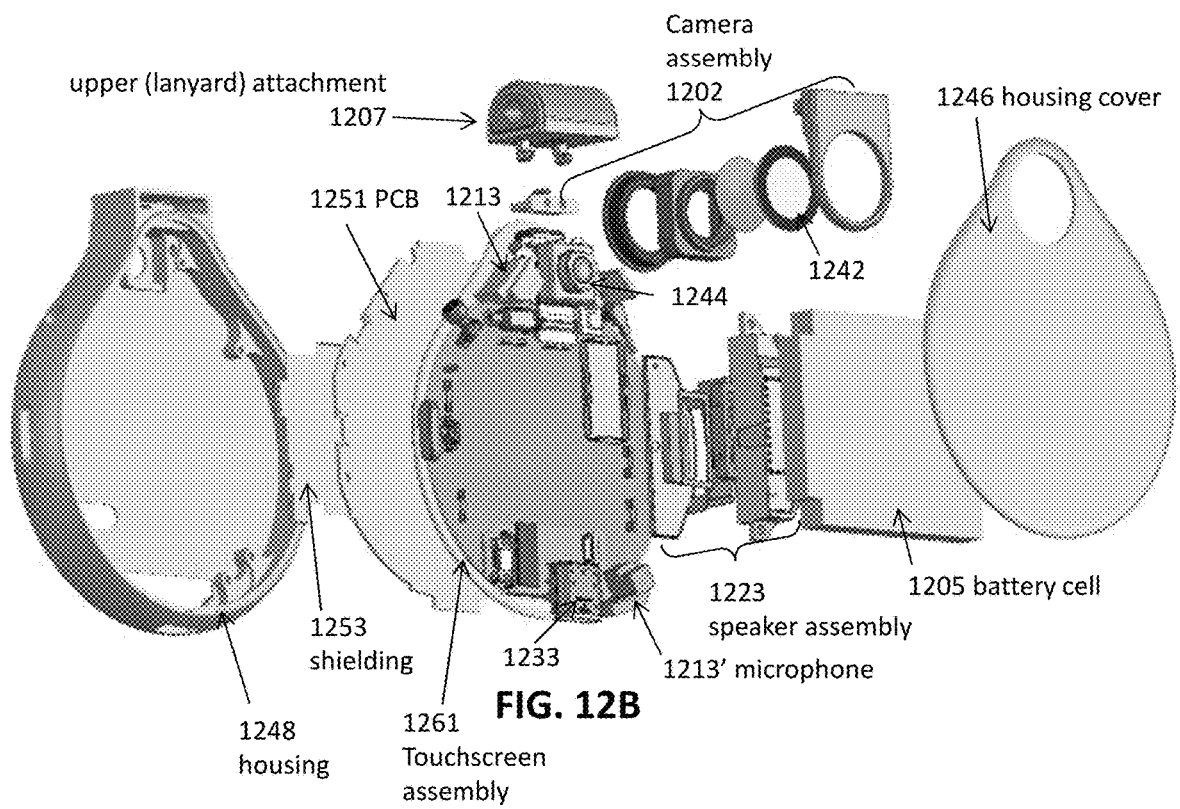
FIG. 12B is a partially exploded view of a video recording and streaming medallion device, showing the components.

FIGS. 12A and 12B illustrate one example of the internal architecture of an exemplary video recording and streaming medallion device. In this example, the outer housing has been removed. The camera assembly 1202 is shown on the upper portion of the device, mounted so that the camera (primary camera) faces out, away from the rounded front side of the device. Two microphone assemblies 1213, 1213' are shown. The battery 1205 is adjacent to the front side, opposite from the touchscreen assembly (not visible in FIG. 12A). The power button 1211 and control button 1209 are shown and couple to input circuitry that in turn communicates with one or more processors (not visible) within the housing. A speaker assembly 1221 is positioned on the side of the device so that sound may exit from the openings in the housing on the curving sidewall portion of the housing. A connector 1233 (e.g., shown as a USB connector) is positioned on the bottom of the device.

An antenna lead 1235 is also shown, and configured to connect to an antenna for wireless communication. The antenna (e.g., a WiFi and/or Bluetooth antenna) is positioned off-center; as shown in FIG. 12A, it is positioned near the top of the device, above the speaker assembly, and adjacent to the battery, on the outward-facing side (the side that faces outward when the device is worn), e.g., the same side as the camera. Because of the internal shielding, battery and internal electronics, the antenna position may be sensitive; the outward-facing, laterally offset position of the antenna (particularly the emitting/receiving surfaces of the antenna) may help in enhancing the signal strength and/or range. In FIG. 12A, the antenna is positioned atop the speaker assembly so that the when the user is wearing the device, the wireless signals are pointed away from the body.

In FIG. 12B a partially exploded view is shown. The housing 1248 has been moved away (as has the back cover 1246 of the housing); in this example, the housing includes an internal wall 1249 that normally separates the touchscreen assembly 1261 from the circuitry (e.g., controller, memory, processor(s), e.g., which may be attached to a printed circuit board). Additional shielding 1253 may also protect the internal components (e.g., the touchscreen, circuitry) from the battery 1205 and/or the power components. The camera assembly 1202 at the top of the device may include one or more lenses 1242 and the digital camera 1244 (e.g. CCD). The components in FIG. 12B may be assembled together to form a compact device (the arrangement of parts shown in FIG. 12B does not necessarily indicate their arrangement within the assembled device).

As discussed above, in operation, the circuitry within the video recording and streaming medallion apparatuses described herein may be configured to streamline communication between the device (local device 1301) and one or more applications (e.g., software that can execute on the processor(s) of the device), as well as the camera. In addition, the device 1301 can be mirrored (or can mirror) a remote device, such as a user's phone, pad, or the like 1315. Finally, all of this information and interaction may be displayed on the rounded display of the video recording and streaming medallion device. This may be accomplished in practice by the use of two or more frame buffers. A first buffer 1303 may be used to generate the display from information processed within the video recording and streaming medallion device 1301. This may include adapting the normally rectangular display images (including images captured by the video camera on the device as well as images/displays generated by application software (including third party application software such as social medial and video streaming services). Thus the first buffer 1303 (frame buffer MDPI-DSI1 in FIG. 13) may interface between the device processor(s) and the rounded display 1313 on the device, so that applications, images and user interfaces 1314 may be properly displayed and interacted with on the rounded touchscreen.

Figure 13:
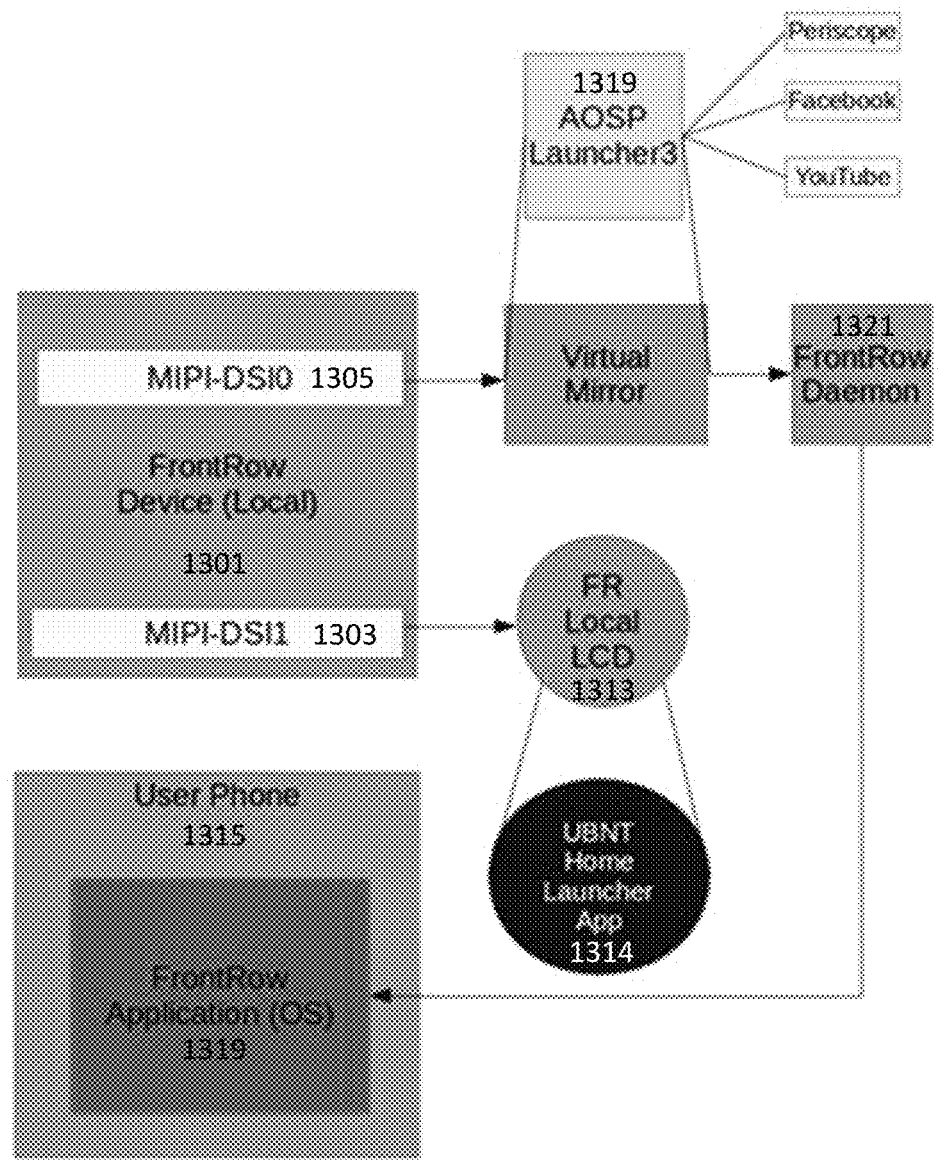
FIG. 13 is a schematic illustrating a video recording and streaming medallion device showing the use of a primary frame buffer (MIPI-DSI1) and a secondary frame (MIPI-DSI0)) buffer and virtual mirror used to communicate between the video recording and streaming medallion device and an second device (e.g., user phone).

Interactions with one or more second devices, such as a smartphone or the like 1315 may be managed through the use of a second buffer 1305 (e.g., frame buffer MIPI-DSI0 in FIG. 13). This frame buffer may be used to form a virtual mirror 1321 that may be used to mirror the processes, displays and inputs between the device 1301 and the second device 1315. This may include the use of additional control (e.g., software) 1319, 1321 that may allow mirroring (using the buffers) and streaming, e.g. in live streaming software such as PERISCOPE, FACEBOOK, YOUTUBE, etc. The second device 1315 may also be executing an application 1319 (e.g., and operating system application that permits mirroring of the device.

The second frame buffer 1301 may therefore be a virtual frame buffer; the first frame buffer 1303 adapts the output to the circular display. Mirroring in this manner may allow the user to look at the images (e.g., video images) and controls/software on both the device and on the second device (e.g., phone). The operating system for the device (OS) may therefore be emulated or run on the second device as well as the video recording and streaming medallion device. This operating system may execute applications directly on the device, and may be mirrored on the secondary device (e.g., phone) through the buffer. The combination of both frame buffers, forming the virtual mirror, allows the system to show content relevant to the device both locally and on the second device, including live streaming of images and running one or more apps, particularly apps for displaying or transmission of the live video stream, without any appreciable lag in speed or quality, despite the otherwise challenging issues with handling twice as much video and input (e.g., from multiple touchscreens).

FIGS. 14A-26B illustrate another example of a video recording and streaming medallion device, including a powered frame integrated into the device that holds and controls the position/angle of the video camera relative to the medallion body. These apparatuses may include a medallion body having a rounded front side and back side, wherein the front side is separated from the back side by a sidewall. The medallion body may form a disk-like base. These variations may be hand-held or they may be worn. In general, these devises may be slightly larger than the wearable devices described above (e.g., in FIGS. 1A-10B). The medallion body may be larger. The medallion portion of the device may have a thickness of between 0.5 cm and 5 cm (e.g., between 0.5 cm and 3 cm, between 0.5 cm and 2.5 cm) and a diameter of between 4 and 15 cm (e.g., between 4 and 13 cm, between 4 cm and 12 cm, between 4 cm and 11 cm, etc.), and a height of between 4 cm and 17 cm (e.g., between 4 cm and 15 cm, between 4 cm and 13 cm, between 4 cm and 12 cm, between 4 cm and 10 cm, etc.). As described above, the medallion body may include a rounded touchscreen on the back side of the medallion body. In addition, a video camera may extend from the medallion body on a power frame that also extends from the medallion body. The video camera is coupled to the powered frame. The powered frame may include a pitch encoder and pitch motor that is configured to rotate the video camera in a pitch axis relative to the medallion body. The powered frame may also include a yaw encoder and a yaw motor, configured to rotate the video camera in a yaw axis relative to the medallion body. In addition, the powered frame may include a roll encoder and roll motor configured to rotate the video camera in a roll axis relative to the medallion body. Each of these motors may be controlled by one or more processors in the device that are configured to move the video camera relative to the medallion body (in pitch roll and yaw). In addition, any of these devices may include one or more controls on the device that are configured to start live streaming of images from the video camera for display on the rounded touchscreen and/or for transmission the device. The control may be part of the touchscreen (e.g., a selectable control on the touchscreen) and/or they may be a button, switch or the like.

In any of the devices described herein, the device may be configured to automatically move the video camera (e.g., video camera assembly) and/or a lens of the video camera assembly either to reduce or eliminate movement artifacts (due to vibration, jostling, etc.) and/or to track movement of an object. The object may be selected by the user from an image displayed on the rounded touchscreen on the medallion body.

For example, FIGS. 14A-14D illustrate one example of a video recording and streaming medallion device having a powered frame. In FIGS. 14A and 14B, the device 1400 includes the medallion body 1401, a powered frame 1403 supporting a camera assembly (video camera 1405). The powered frame includes a series of rotating joints connected to each other in series, each configured to move in one of pitch, roll, or yaw. These joints may be gimbal joints. Each joint may therefore be compliant in one of pitch, roll or yaw, and rigid in the other rotational directions. For example, in FIG. 14A, the first joint 1411 is configured to rotate the camera around a yaw rotational axis 1413 but not rotate in pitch or roll. Similarly, the device includes a pair of second joints 1415, 1415' that operating in parallel and are both configured to rotate the video camera around a pitch axis 1417. The device may also include a roll encoder and a roll motor within the powered frame for moving the video camera around a roll axis 1419. The video camera may be be held within or at least partially within the housing of the powered frame. The housing of the powered frame may be continuous with the housing of the medallion body. As mentioned, the device shown in FIGS. 14A-14D may also include a rounded (e.g., circular, semi-circular, oval, etc.) display, such as a touch-screen 1421, as shown in FIGS. 14C and 14D, which show the apparatus in a collapsed (folded) configuration.

In some variations, the touch screen is on the back side, as shown in FIGS. 14A-14C; alternatively, the touch screen may be on the front side. Alternatively or additionally, both sides may include a touch screen.

The video recording and streaming medallion device having a powered frame shown in FIG. 14B also include controls on the medallion body, such as a power button 1423 and an input control 1409. The input control 1409 may be pushed, or may be moved, joystick-like, up/down, left/right. This joystick like control may be used move the powered frame and move the video camera. Additional controls/buttons may include zoom in/out, buttons to take one or more images as discussed above. Any of these devices may also include one or more ports 1433, e.g., USB ports for providing power (including recharging an internal battery) and/or transferring data.

Figure 15A:
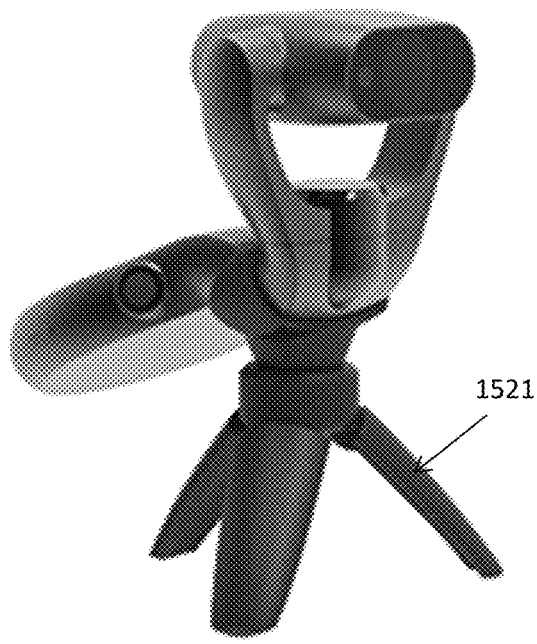
FIG. 15A shows the device of FIGS. 14A-14D (a video recording and streaming medallion device having a powered frame) coupled to a mount, where the mount is configured as a tripod.
Figure 15B:
FIG. 15B shows a video recording and streaming medallion device having a powered frame coupled to a desk mount.
Figure 25A:
FIG. 25A shows an example of a video recording and streaming medallion device having a powered frame coupled to a mount. The mount may be used to connect to a separable stand, as shown in FIGS. 26A-26B.
Figure 25B:
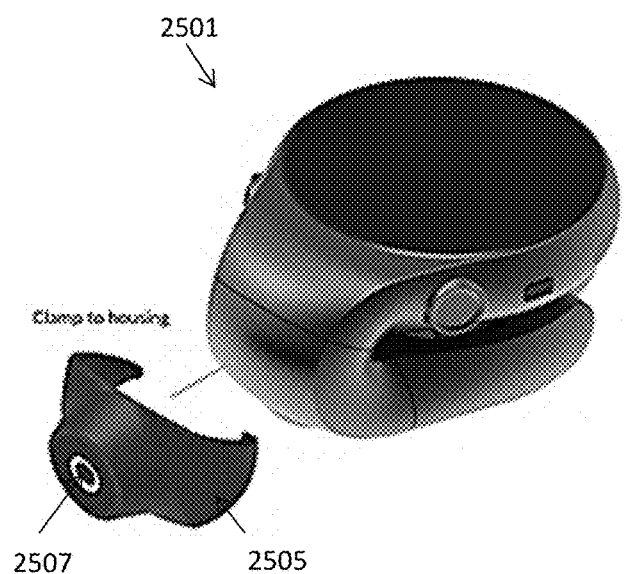
FIG. 25B shows coupling of the mount, configured here as a clamp, connecting to the housing of the device. The mount may connect to either the body portion (including the touchscreen), or the connection, or neck region, between the powered frame and the device body.
Figure 26A:
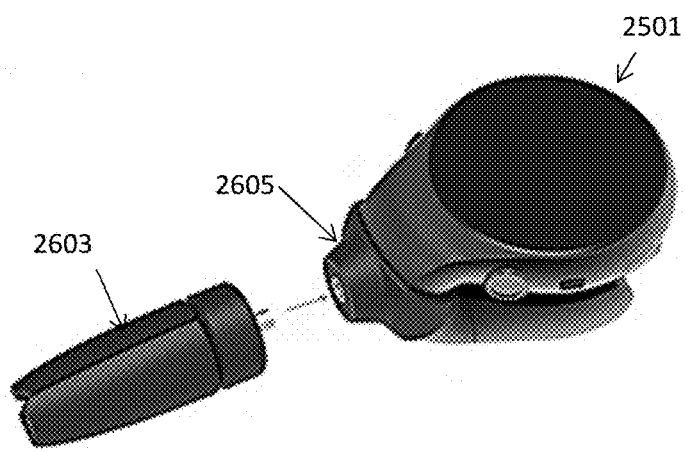
FIG. 26A shows the attachment of a stand (e.g., tripod) to the mount shown in FIG. 25A. The mount may be coupled in the same manner in FIG. 10A-10B, above, e.g., using a hybrid magnetic and mechanical attachment that is releasable/lockable. Alternatively, the connection may be a threaded (screw-on) connection or other mechanical connection.
Figure 26B:
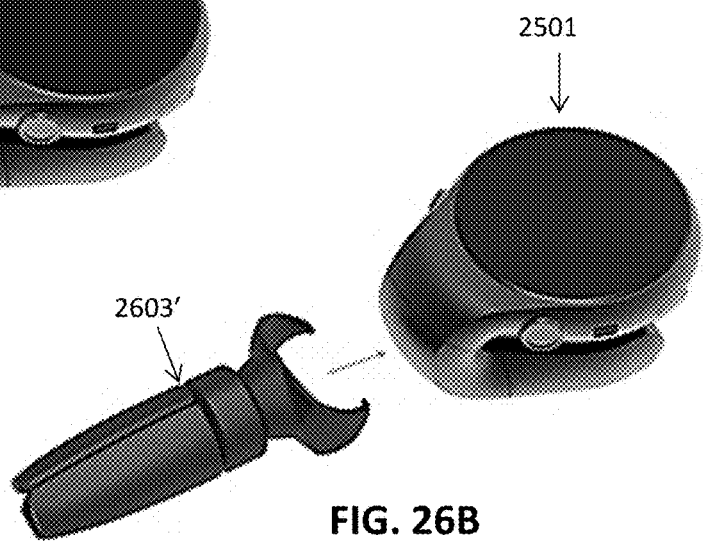
FIG. 26B illustrates and example in which the stand (e.g., tripod) is either integral with the mount or pre-attached to the mount before coupling with the device, as shown.

The apparatuses described herein may also include one or more stands or mounts to hold the device. For example, FIGS. 15A and 15B illustrate two examples of mounts 1521, 1523 that may be used to hold the apparatus. The mounts may be for placing on a surface (e.g., table, etc.), for connecting to a person, vehicle or object (e.g., clip, magnetic attachment, etc.) or for being hand-held. In FIG. 15A the mount is a tripod. In FIG. 15B, the mount is a desk mount 1523. The mount may be attached to the device in any appropriate manner, including by a releasable attachment such as those described above. Alternatively or additional, the medallion body and/or powered frame portion of the device may include an attachment for coupling with a mount or stand. For example, FIG. 24 shows one variation of a device having an attachment 2405 to which a frame may be coupled. The attachment may be magnetic and/or mechanical. For example, the attachment may be threaded. FIGS. 25A and 25B show a connector portion of a mount 2505 that is configured to clamp to the device 2501 housing, as shown. In this example, the mount attaches by clamping (e.g., mechanically attaching) on to the region of the device between the medallion and the first movable joint of the powered frame. The mount itself includes an attachment 2507 that couples to a stand, as shown in FIG. 26A. The attachment may couple to the stand as mentioned above, e.g., by a mechanical and/or magnetic connection, such as by a threaded region. In FIG. 26B the stand portion 2603' is integrated with the mount portion 2605 (either already coupled together or integral parts of a single device).

Figure 16:
FIG. 16 is a back view of a video recording and streaming medallion device having a powered frame similar to the one shown in FIGS. 14A-15B, showing an example of a video being displayed on the rounded (e.g., circular) touchscreen display.

FIG. 16 shows a back view of a video recording and streaming medallion device having a powered frame 1601 similar to the one shown in FIGS. 14A-15B, showing an example of a video being displayed on the rounded (e.g., circular) touchscreen display. In this example an object 1603 (e.g., a person's face) has been selected on the touchscreen. As mentioned above, the device may be configured to track the object automatically.

Figure 17A:
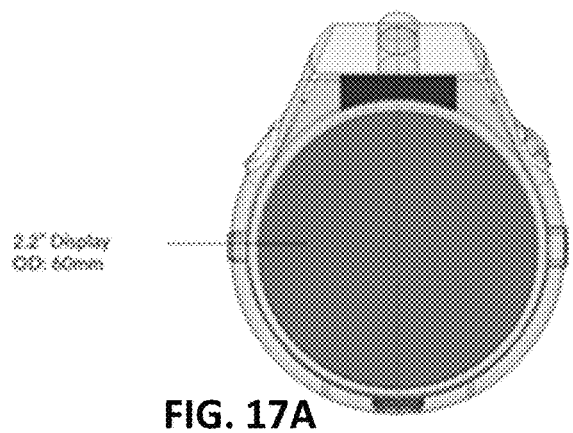
FIG. 17A shows a partially transparent view into the back of the body portion of a video recording and streaming medallion device having a powered frame such as the one shown in FIG. 16, showing the video display (touchscreen).
Figure 17B:
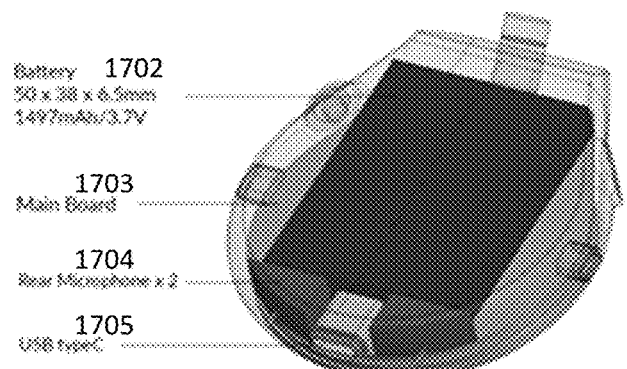

FIGS. 17A and 17B show partially transparent views of the medallion body portion of a video recording and streaming medallion device having a powered frame. In FIG. 17A, the display is a rounded (circular) 2.2" display having an outer diameter of 60 mm. These dimensions are exemplary only, and are not intended to be limited. For example, the dimensions may be +/-10%, 20%, 30%, 40%, 50%, etc.

FIG. 17B shows a video recording and streaming medallion device having a powered frame in which the front side has been made transparent. In this example, the battery 1702 (having exemplary dimensions of 50×38×6.5 mm) is shown. The main board 1703, and rear microphone 1704 are shown as well as a connector 1705 (e.g., USB type C connector).

Figure 18:
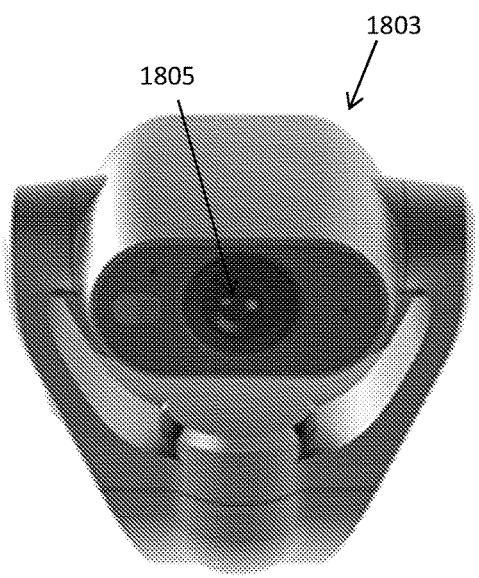
FIG. 18 shows a top perspective view of a video recording and streaming medallion device having a powered frame, with the camera directed forward (in the top direction).
Figure 19A:
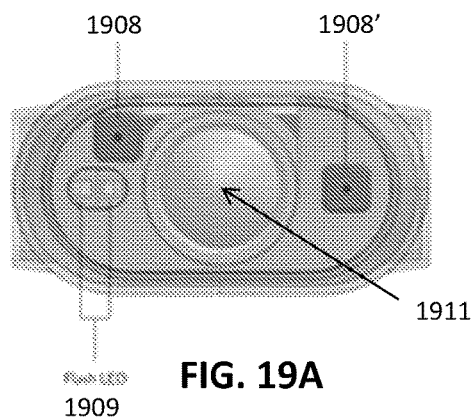
FIG. 19A schematically shows a front view of a camera head for a video recording and streaming medallion device having a powered frame showing the front end of the camera which may be moved to adjust the position of the camera for the device.
Figure 19B:
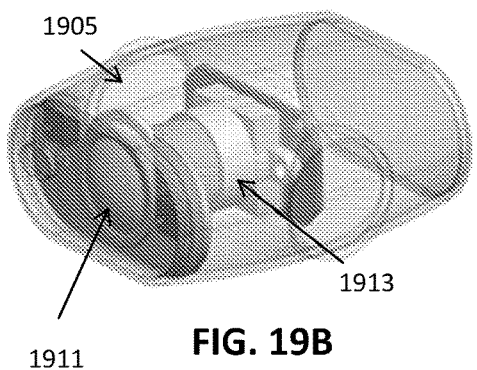
FIG. 19B schematically shows a side perspective view of the camera head shown in FIG. 19A.
Figure 20A:
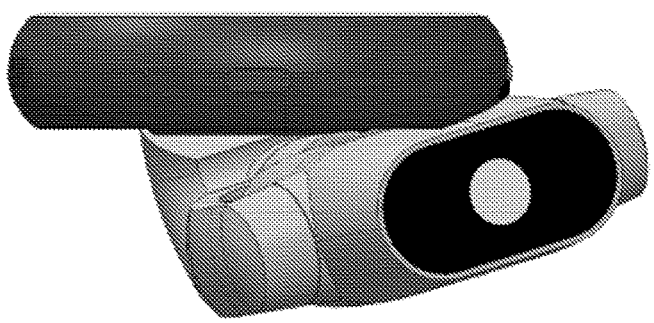
FIG. 20A is a side view of a video recording and streaming medallion device having a powered frame.
Figure 20B:
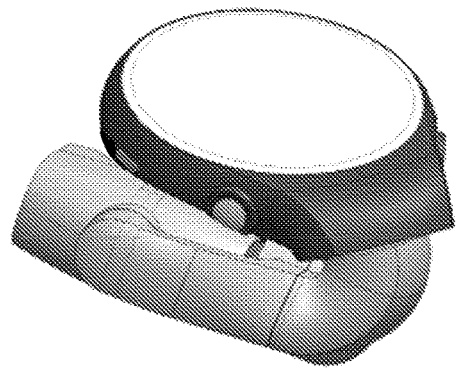
FIG. 20B is a bottom perspective view of a video recording and streaming medallion device having a powered frame.

FIG. 18 shows the powered frame portion 1803 of a video recording and streaming medallion device as described above. In this example, the device includes a video camera within the frame portion of the device. FIGS. 19A and 19B show the camera within the upper portion of the frame 1905. The upper frame portion may also include a microphone 1908, 1908' (two are shown in FIG. 19A) as well as one or more illumination sources (e.g., flash 1909), and the outer lens 1911 of the video camera is also visible. In FIG. 19A the front face of the upper frame portion is shown. In FIG. 19B, the camera assembly 1913 (video camera assembly) which may include one or more lenses and a digital sensor (e.g., CCD). The video camera assembly (all or part of it) may be movable within the housing of the upper portion of the frame, e.g., by moving in roll.

For example, FIGS. 21A-21B illustrate partially transparent views of an example of a video recording and streaming medallion device having a powered frame. In this example, the medallion body portion of the device 2101 includes a touch screen 2105 (shown here as a 2-in LCD touch screen), and internal circuitry including one or more processors and control circuitry 2106 for controlling the powered frame and performing the video, display and communication functions described above (including mirroring a second device). A battery 2107 is also included (e.g., in this example, a 62×62×8 mm battery having up to 2500 mAh). The medallion is connected directly to the frame (e.g., powered frame) and connects to a first region. A speaker 2111 (speaker assembly) may be included in this first region 2110 and a yaw joint configured to rotate about a yaw axis is shown. This first region may also be connected to the medallion body by a bendable or foldable region, as shown in FIGS. 14C and 14D. The yaw encoder 2115 may provide data on the rotational position of the output of the yaw motor 2113 relative to the first region 2110 and therefore relative to the medallion body. The output of the yaw motor is the more distal portion of the frame, distal to the yaw joint, where the proximal portion of the frame connects to the medallion body. The frame may also include a pitch joint between the upper frame portion 2112 and the frame. A pitch motor 2133 may be within the frame housing a pitch encoder 2131 may also be included. The pitch motor may drive rotation of the output (e.g., the upper portion of the frame). The upper portion of the frame may enclose the camera assembly 2125 which may include one or more lenses 2127. The upper portion of the frame may also enclose a roll encoder 2141 and roll motor 2143 configured to roll all or a portion of the camera assembly 2125. The upper portion of the frame may also enclose one or more microphones 2161, a flash or other light source 2163 and may be covered by scratch resistant glass 2165. The internal electrical components may be connected by flexible printed circuits 2170 (FPCs) that extend through the device, as shown in FIG. 21A and in greater detail in FIG. 22.

As mentioned, any of these devices may include one or more controls. For example, FIG. 23A shows an example of two controls on the left side of an exemplary device having a powered frame. In FIG. 23A, a trigger button 2303 is shown. This button may control one or more of: button centering of the camera (e.g., pressing the button once may center the powered frame and therefore the camera), selfie mode (e.g., pressing the button twice may take a selfie images with the camera facing the rear of the device), and locking/unlocking the device (e.g., holding down the button may enable locking/unlocking of the device). A slider button 2305 may be used to turn on/off object tracking mode (e.g. toggling between object tracking and standard mode). In FIG. 23B, the power button 2307 may be used to turn on/off the device (e.g., a long press turns the device on/off) and/or turn the screen on/off (e.g., a short press turns the screen on/off). A second control button 2309 may be pushed and or used as a joystick, moving up, down, and side to side, to manually control the direction of the camera by controlling the movement of the powered frame. For example, a single push of the button may turn on/off recording/livestreaming. A double push may pause or play the diary. Holding down on the button may trigger burst mode, when a series of images may be taken. As mentioned, manipulating the button like a joystick may cause the camera to manually move (e.g., in pitch and yaw), rotating the button may cause the camera to move in roll.

Figure 27:
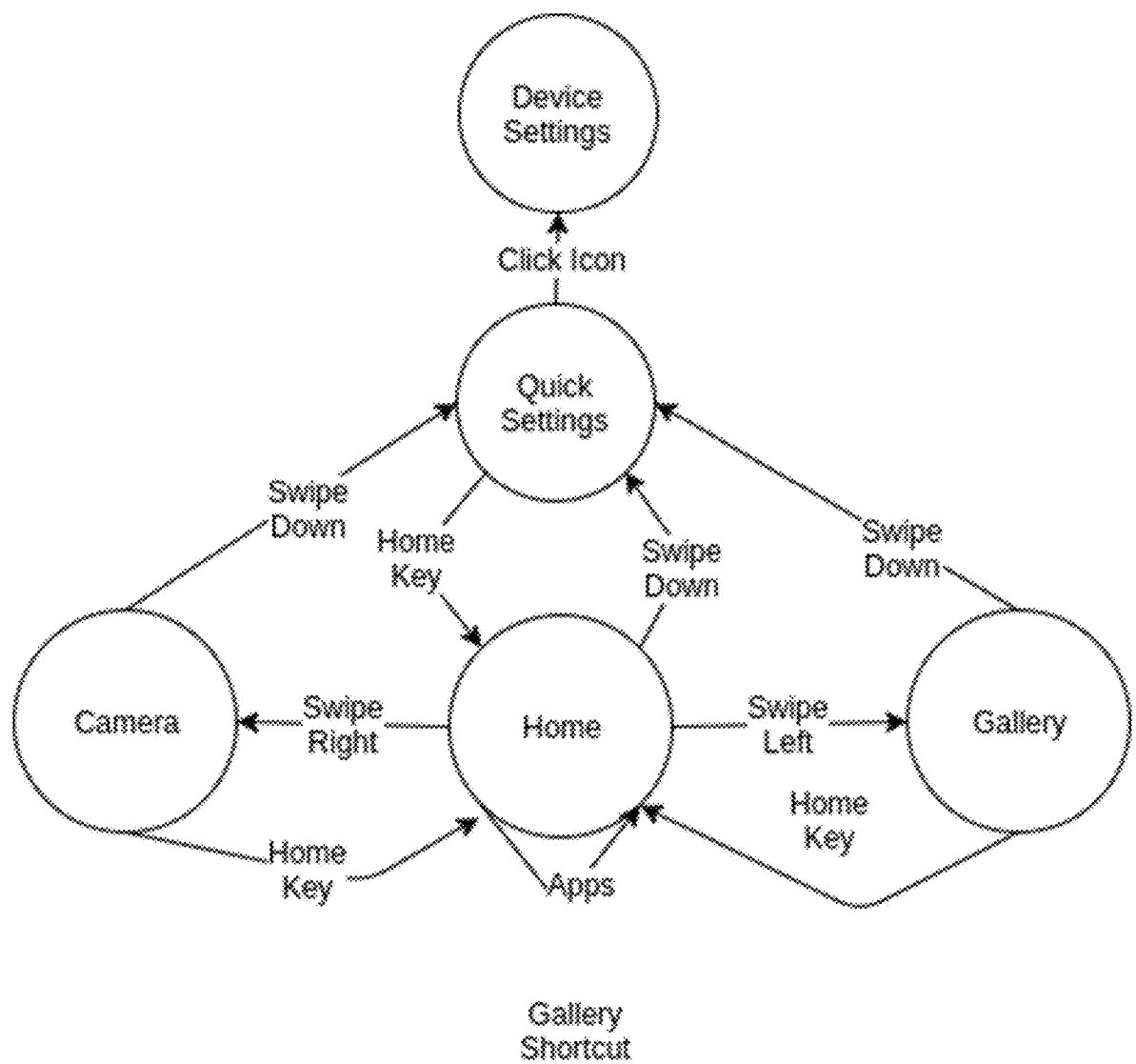
FIG. 27 is an overview of a user interface for a video recording and streaming medallion device.
Figure 28:
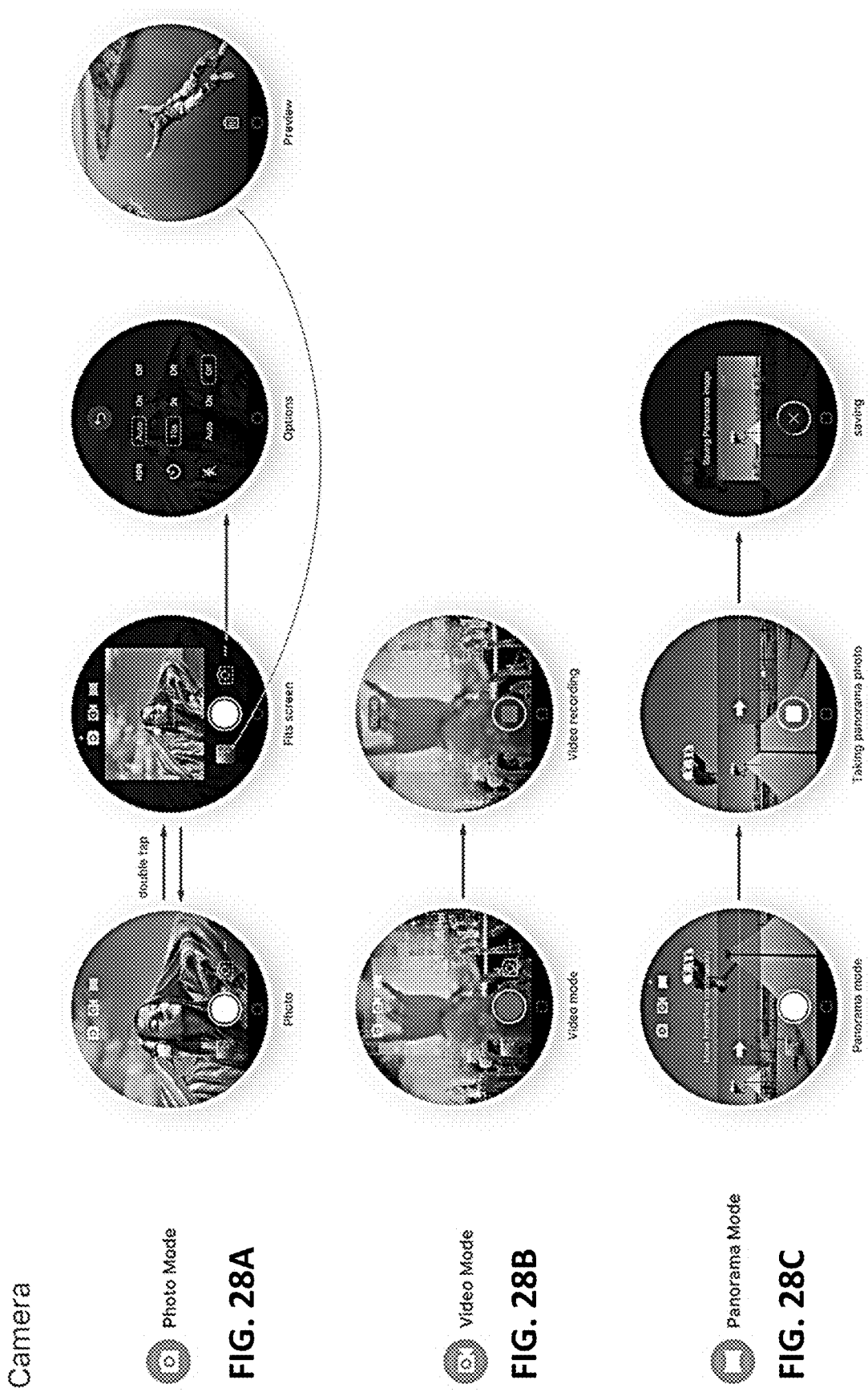
FIGS. 28A-28C illustrate flow diagrams showing operation of a video recording and streaming medallion device in various modes.

In operation, the apparatuses shown herein may operate in one or more modes, including live streaming, playback, manual and automatic tracking, time-lapse, automatic panning, and the like. The touchscreen, by itself or in combination with the controls on the housing of the device, may be used to operate the device. For example, FIG. 27 is a flow diagram showing different control screens and ways to toggle between them for the touch screen of the device. In FIG. 27, the home screen may include status indicators (power/charge, memory, etc.) as well as apps that may be selected (e.g., to execute one or more social media tools, such as FACEBOOK, SNAPCHAT, YOUTUBE, etc.). Pressing the home key from any of the screens may return you to this home screen. Within the home screen the user may move around by sliding a finger across the screen. Swiping left, right, up or down may move to different screens, as shown in FIG. 27. For example, swiping right from the home screen may enter a camera mode in which the camera may be turned on (e.g., for live streaming) and/or controlled. FIGS. 28A-28C illustrate exemplary screens for the camera mode, showing a photo mode (FIG. 28A), a video mode (FIG. 28B), and a panorama mode (FIG. 28C). Options and settings may be set from this screen. For example, swiping down from this screen (or many of the screens) may display a quick settings screen, having icons that can be selected to choose device settings.

Figure 29:
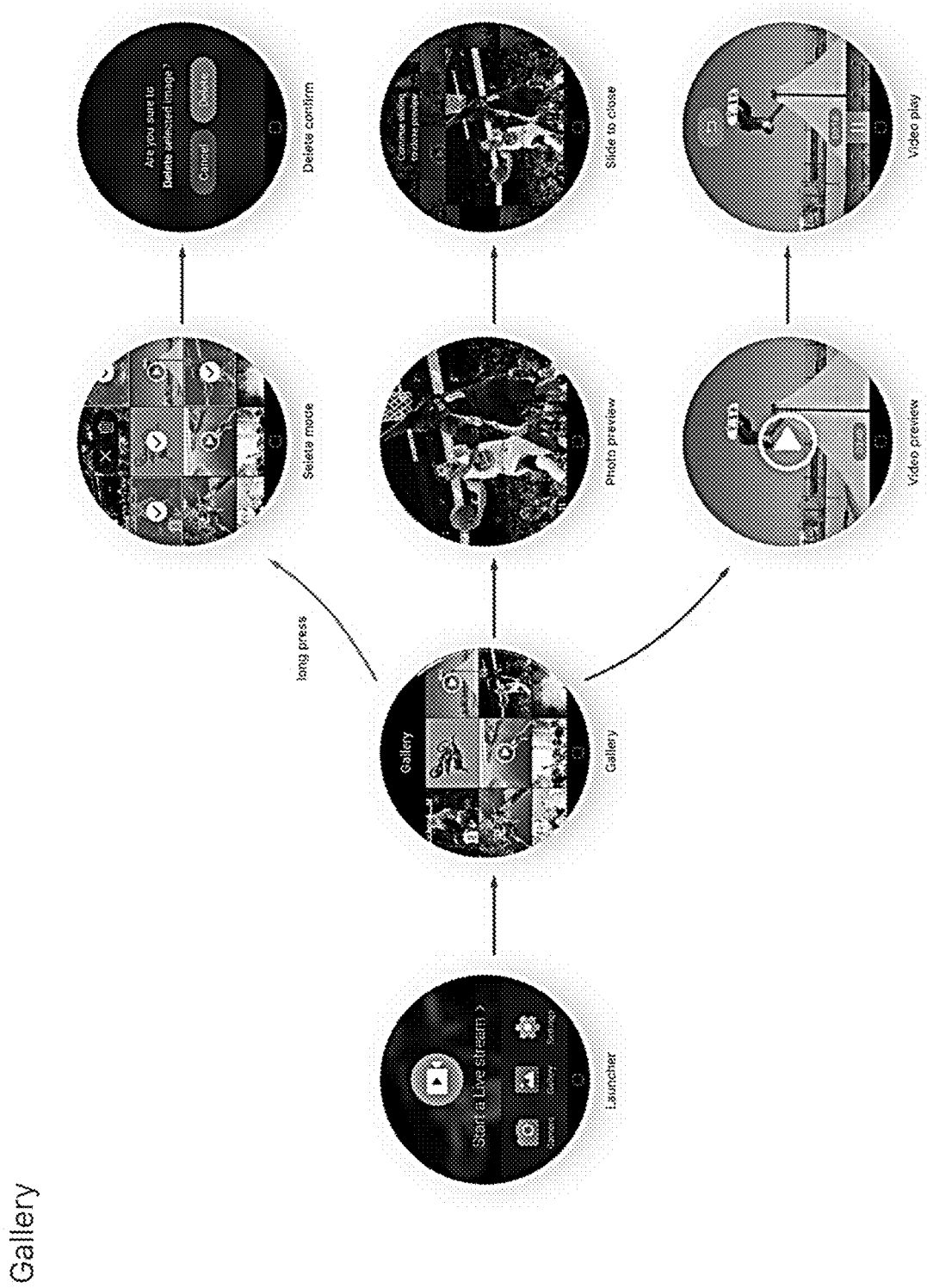
FIG. 29 illustrates a user interface/control screens for the rounded touch screen when the device is displaying a gallery of audiovisual media (image, video, etc.).

Swiping left from the home screen may bring you to a gallery screen, displaying the gallery of images and/or videos on the device, which may be selected to play, transfer (e.g., upload, including uploading to social media or the like), as illustrated in FIG. 29. Images/videos may be selected and deleted or uploaded, as illustrated.

Figure 30:
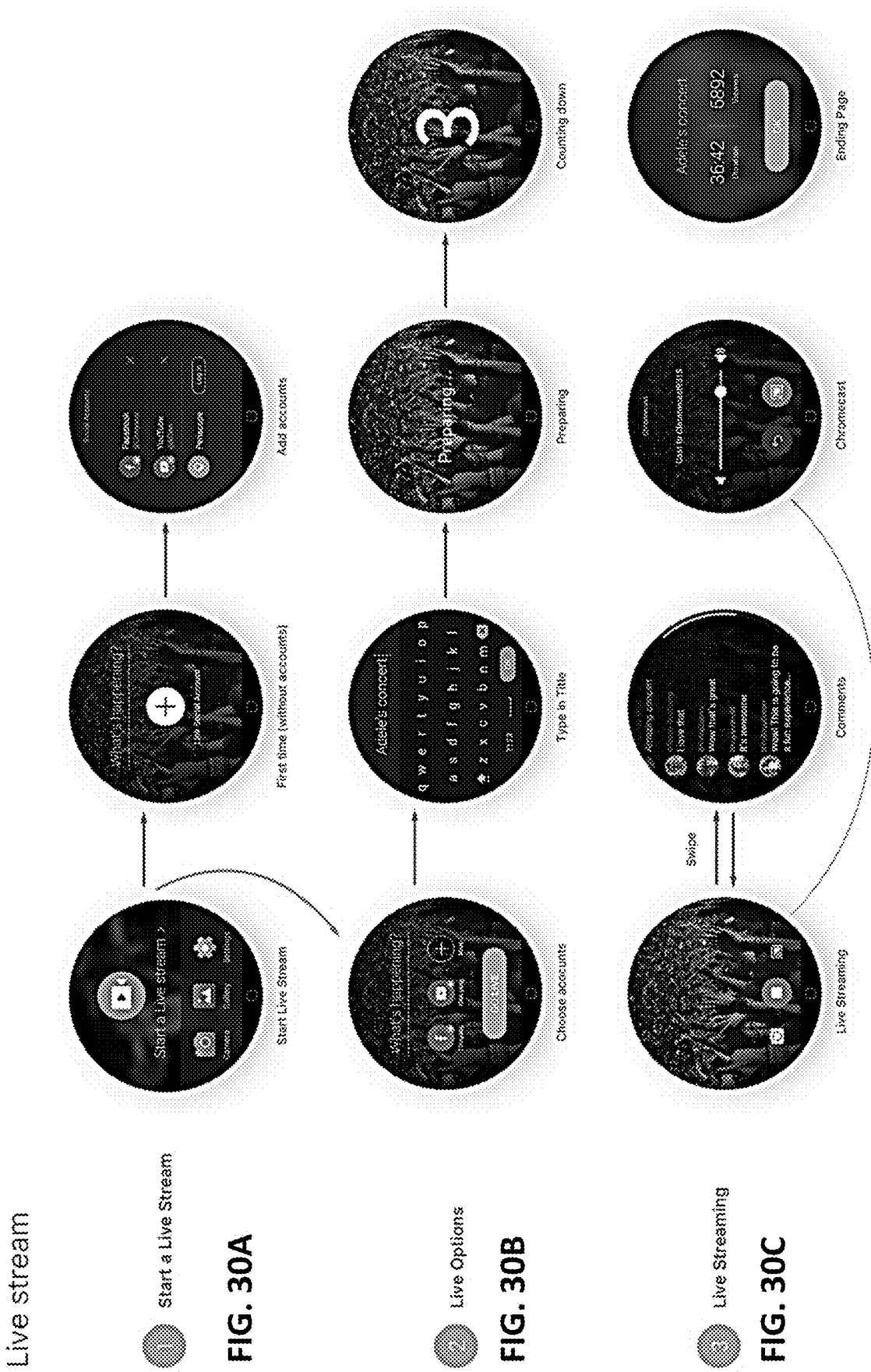
FIGS. 30A-30C show flow diagrams showing operation of a video recording and streaming medallion device when live streaming.

Any of these devices may be configured to allow the device to start live streaming with a control from the touch screen and/or from a switch or button. For example, FIG. 30A-30C illustrates live streaming coordination using the devices described herein. In FIG. 30A, the user may initiate live streaming and link to a social media account immediately. One or more accounts may be linked to the device for one or more social media platforms. Further, the device may allow concurrent communication with multiple social media applications. As shown in FIG. 30B, the apparatus may permit setting of options, such as naming or labeling the live streaming event, and setting the timing, e.g., start time (e.g., countdown), stop time, duration, resolution, etc. In FIG. 30C, live streaming may be observed on the device itself, e.g., on the touch screen, and may allow commenting or viewing comments, and tracking the social network feedback (e.g., number of views, etc.).

Figure 31:
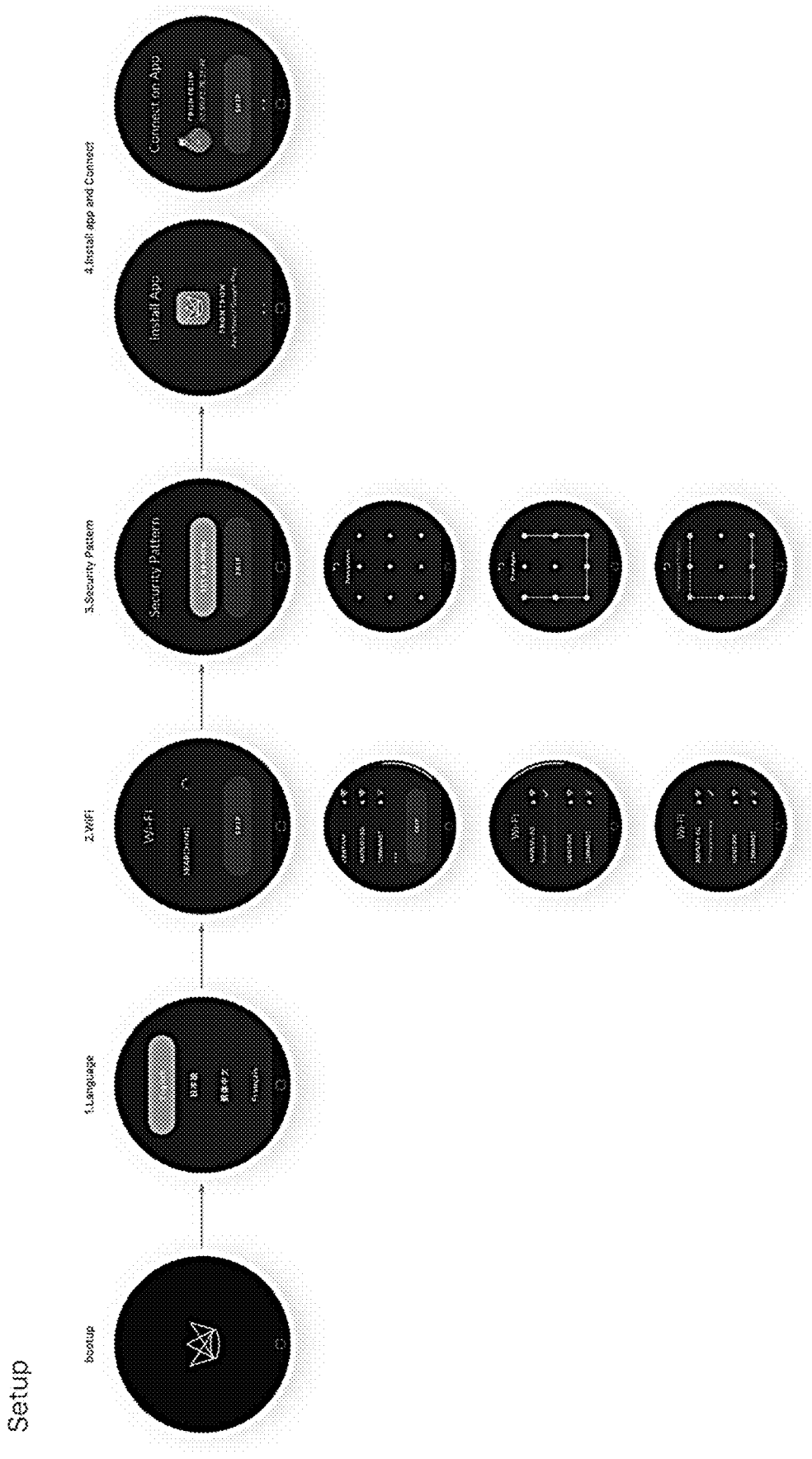
FIG. 31 is a flow diagram showing setup of a video recording and streaming medallion device.

FIG. 31 illustrates a general setup menu that may be accessed, e.g., as shown in FIG. 27, by selecting a setup icon from a general settings window. Alternatively or additionally, the setup may be selected or chosen by a general setup from initiation or startup of the device. For example, language to be used, WiFi connection(s) may be selected, a security pattern may be entered (e.g., a pattern drawn on the screen to unlock the device), etc.

As mentioned, the devices described herein may be any appropriate dimensions, weight, etc. FIG. 32 illustrate specifications for one exemplary device. For example, the dimensions may be approximately 6 cm×7 cm×1.2 cm, and the weight may be approximately 55 g. For example, for the wearable device, the weight may be between 1 g and 100 g (e.g., between 20 g and 80 g, between 30 g and 70 g, etc.). The device may wirelessly connect via one or more protocols (e.g., USB 3.0/2.0 type C, 802.11b/g/n/ac, Bluetooth 4.1 LE, GPS, etc.). The camera sensor may be any appropriate sensor. In variations including both a front and rear sensor, the front sensor may be more sensitive than the rear sensor (e.g., may have a higher resolution, etc. The lenses in the camera(s) may be any appropriate lens, including F2.0 lenses. Similarly, the viewing angles of the camera(s) may be between 180 and 60 degrees (e.g., the front camera may have a larger (or adjustable) viewing angle than the rear camera. All of the other specified parameters shown for the device in FIG. 32 are exemplary only, and other characteristics may be used.

Operation

In operation, any of the apparatuses (e.g., devices and systems) described herein may be configured to take video (images, images and sound), video clips, and/or still photographs. Thus, these apparatuses may operate in one or more modes, and may be configured to improve image/video quality as well as provide numerous modes of operation that allow control of the operation of these apparatuses.

For example, any of the devices described herein may be operated in a story mode (or "smart capture" mode), which may be used to provide time-lapse imaging. The user may preselect the parameters for story mode, including the duration of video capture, the frequency which video is captured, the resolution at which video is captured, the use of one or more video/image enhancements (see below), including correcting or motion of the device, correction for light level, varying the capture rate based on motion detection, averaging a predetermined number of images per capture, storing the sequence of captured image on the fly as a video, and/or automatically adjusting the light level between images. Alternatively or additionally, the apparatus may provide defaults for all or some of these parameters.

For example, in the story mode, a series of time-lapse images may be taken. The user may enter story mode as described above, including selecting by button (e.g., including an icon or virtual button) on the touchscreen; alternatively the user may select the story mode by selecting one or more actual controls (e.g., sliders buttons, etc.) on the outside housing of the device, including the rounded medallion body. For example, as will be discussed below, one or more of the buttons may be a media button that may be configured (e.g., user or factory set) to provide to act as a shortcut to operate the device, including operating it in one of the modes described herein (e.g., live streaming, story mode, selfie mode, etc.). The media button may provide user-configurable shortcuts to each of these modes, including taking still shot or live steaming, etc. For example, a media button may be configured so that one push/click of the button takes a photograph, two clicks within a predetermined time period (e.g., a few seconds) being video capture, three click enters live streaming, etc.) Since the devices described herein may be wearable and/or held or operated by one hand, the media button can be operated quickly with one hand.

As mentioned, the story mode is essentially a time-lapse video capture mode. For example, the apparatus may be configured, e.g., by executing control logic in the processor (s) of the device, to take a picture (or burst, or group of pictures) every t seconds, minute, or hours at a fixed interval or at a variable interval. This mode may be referred to as a 'smart' capture mode because the apparatus is configured to apply some logic to control one or more of the image capture interval and/or the optical settings (e.g., light balance).

For example, in story mode, the user may select the variable/automatic interval so that the apparatus automatically adjusts the interval to take an image or group of images (burst of images) based on the detection of movement, either or both movement of the apparatus (e.g., using an accelerometer in the apparatus) and/or based on movement detected in the frame of the camera. For example, the camera may take images during the interval before the next time-lapse image(s) are to be taken, and may examine them to determine if an object (e.g., a user-selected object or a within a predefined region of the field of view of the camera) has moved or is moving. If movement/change is detected, the apparatus may shorten the time interval between time-lapse images and/or immediately take one or more images to be added to the time-lapse video stream. If no movement/change is detected, the interval is completed.

If no movement (above a threshold) is detected at one or more of the interval time points, then the apparatus may extend the length of the interval time points (e.g., may decrease the frequency between images in the series).

Any of the apparatuses described herein, in any of the modes (including video, single-image capture, multiple-image capture, snapshot, etc.) may enhance the image quality by adjusting the speed of capture of the image based on movement of the apparatus as detected from one or both of: an accelerometer within the apparatus and/or analysis of motion from the video apparatus. If there is a lot of movement, as detected, for example, from the accelerometer detecting movement within a predefined frequency range (e.g., greater than 10 Hz, greater than 20 Hz, etc.), the apparatus may accelerate the capture rate of picture. In particular, the apparatus may be configured to determine (e.g., from the accelerometer) if there is movement while the video camera is acquiring an image, during the frame capture period, then the apparatus may adjust the capture rate (reducing it) to prevent or reduce blurring. The apparatus may also look at the image itself. If the image is dark, the apparatus may adjust the exposure time (assuming the accelerometer does not indicate movement during the exposure time).

Thus, any of these apparatuses may be configured to detect if an image is blurry based on motion of the device (e.g., from the accelerometer or other motion sensor on the device) during the exposer time. If the movement sensed is above a threshold, for example, the device may automatically take additional images immediately after the intended picture and/or may adjust the exposure time (reducing the exposure time) as mentioned. Thus, unlike other systems that detect blur by image processing, these apparatuses may instead deduce or infer blur ('detect blur') based on motion sensors in the apparatus before and during the exposure as well as the lighting levels. Thus, the use of an accelerometer on the device as well as the light level (which may determine how long the exposure will take) may indicate that the image will likely be blurry. The apparatus may use this prediction to modify either how the image is taken, or may modify the timing (e.g., in the time-lapse, or story, mode) of the image acquisition to reduce the likelihood of a blurry image.

In the story mode, the apparatus may be configured to compare the illumination level (light level) between images at to automatically adjust the image capture time of the currently acquiring) or next acquired image. This may be achieved, for example, by taking multiple images at each time point in the time-lapse series and using the first (or first few images) to determine the light level in the image, movement of an object in the image, etc., and then adjust the exposure time for subsequent images in the burst of images at the time point. In this manner the quality of the image may be adjusted without relying on image processing, which my result in a more robust image. Any of the images (include video or individual images) may be post-processed, e.g., by filtering, averaging, etc.

In some variations, story mode may be configured to take one or more pre-images prior to (including immediately prior to) the time point for the time-lapse series. As described above, these images may be used to adjust the exposure time, lighting (e.g., turning on/off LED s on the device, adjusting the duration of the interval of the time-lapse series, etc.). In addition, the story mode may allow the device to "sleep" during the intervals when it is not recording images, and/or transition to a lower-power mode, as described below.

As mentioned above, story mode may encode images as a video on the fly, without or in addition to storing separate images. For example, the time lapse images may be encoded into a H624 video file as the time-lapse recordings are occurring.

Any of the devices described herein may also include two or more microphones positioned in different location (e.g., at a top and on a bottom region). The top microphone may be adapted to capture the voice of the wearer, and the microphone on the bottom may be used for noise-cancellation (e.g., due to noise from the clothing of the person wearing the device). Both microphones may be on the outward (front) facing side of the device, or on the inward (back) facing side, or on opposite sides.

Any of the apparatuses described herein may also be configured to detect and record lux values so that they may use this information to determine exposure time based on different criterion depending on the mode and/or the lux value detected. In particular, the apparatuses described herein may include multiple image quality (IQ) parameters (e.g., tables) determining the exposures at different light intensities. For example, described herein are apparatuses configured to record the lux values (including a running average of the lux values) and to determine device thresholds (e.g., a low lux value threshold) based on a particular IQ parameter and to automatically apply a low-light protocol, such as averaging (in a low light mode) if the apparatus detects the lux value is at or below the threshold.

Thus, the apparatuses described herein may have multiple sets of IQ parameters, which may determine how you process the images. Thus, a sensor may determine the lux value (or a running average of lux values) and this value may be compared to preset values in an XML table(s) to determine exposure at the determined light levels. The apparatus may switch between different sets of IQ levels based on the mode of operation engaged (e.g., story mode, livestream mode, or video mode, picture (snapshot) mode, etc.). For example, in story mode when running smart capture, as described above, the exposure time may change. This may mean that if exposure time exceeds a threshold (e.g., 16 ms), then more than half (e.g., 55%) of the pictures will be blurry, which may be the case if the person wearing the apparatus is breathing, moving, etc. If that is the case, the apparatus may toggle between different IQs based on the exposure time (e.g., above or below 16 ms), which may also depend on the mode. For example, the IQ parameters for story time may be different than for other modes, which may each have different corresponding IQ sets (e.g., tables). Thus, these apparatuses may have multiple IQ tables for the different modes. In contract to many other devices, which are unable of switching the tuning (IQ settings) in real time, and may therefore rely primarily on filters (e.g., post-processing), these apparatuses may apply actual IQ swaps based on the mode and lux measurements.

Battery Life

Any of the apparatuses (devices and systems) described herein may be configured to regulate power (e.g., battery power) to reduce the overall power consumption and therefore extend time between charges. For example, depending on the mode of operation (e.g., livestreaming, story mode, etc.), and/or depending on the user activity, these apparatuses may toggle between different processing speeds, including a low-processing speed state of operation and a higher-processing speed state of operation. For example, in story mode the apparatus may suspend or stop some or all non-essential processes for a predetermined amount of time. This may be referred to as time sequencing the power consumption of the device. For example, if the user is operating in story mode (e.g., time-lapse recording), based on movement of body as determined in the wearable or handheld device by a motion sensor such as an integrated accelerometer, the apparatus may determine that it is appropriate to enter a sleep mode for a predetermined amount of time. In this lower-power or sleep mode, the device may shut off or suspend the use of certain processes such as turning off/sleeping the GPS chip, WiFi/Bluetooth, the touchscreen display, etc. Thus, the apparatus may then sleep these elements, and can also shut down other non-essential apps to save power. Furthermore, the apparatus may toggle the CPU governor to a lower frequency of operation depending on the mode of operation, user activity and/or movement of the apparatus. For example, when the apparatus is required to operate at a higher frequency in modes demanding more rapid response time and/or concurrent operation of the mode and one or more apps such as social media apps, the CPU governor may be toggled to a higher rate (e.g., CPU can be toggled to run at 1.2 GHz or higher). The higher rate may consume more power. At other times, with less demanding modes and/or less activity from the user, the CPU governor may be toggled to a lower rate (e.g., the CUP can be toggled to run at 650 MHz or thereabouts). In some modes, e.g., story mode, the apparatus can use the lower rate, which may take the device longer to operate, but this lag may not be notice by the user and may take substantially less power. The apparatus may also or additionally toggle between different CPU rates based on the software or firmware (e.g., apps) running on the apparatus. When the apparatus is mirroring a second device (e.g., phone) the CPU may be toggled to match the rates of the second device. In some variations, the apparatus may toggle between the different rates (higher and lower rates) at least based in part on the CPU load. For example, livestreaming of images may be more real-time and therefore the processing speed may be important; in this mode, the apparatus may therefore be configured to function primarily in a higher rate (e.g., 1.2 GHz), allowing the current application of more resources in the apparatus. In another example, when the camera is recording (e.g., image stabilization, de-warping of the image) if the standard video is being recorded, a lower CPU rate may be applied.

Example

Figure 33:
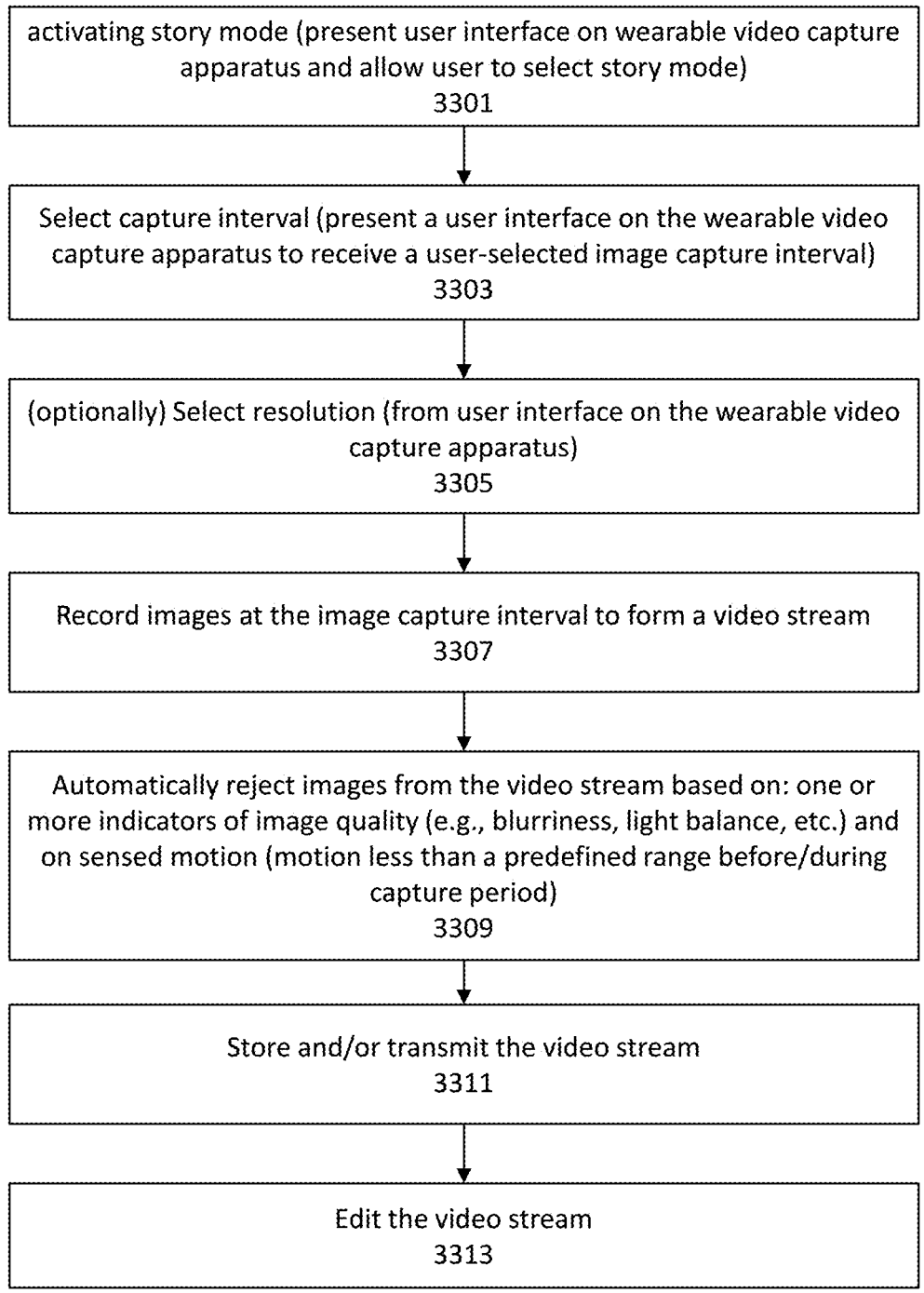
FIG. 33 is an example of a method of recording a time-lapse video diary.
Figure 34A:
FIG. 34A is an example of a user interface for selecting story mode.
Figure 34B:
FIG. 34B is an example of a user interface on the wearable video capture apparatus configured to receive a user-selected image capture interval, resolution and/or displaying a time-stamp (or displaying the translucence of the time stamp) on the images of the video stream.
Figure 34C:
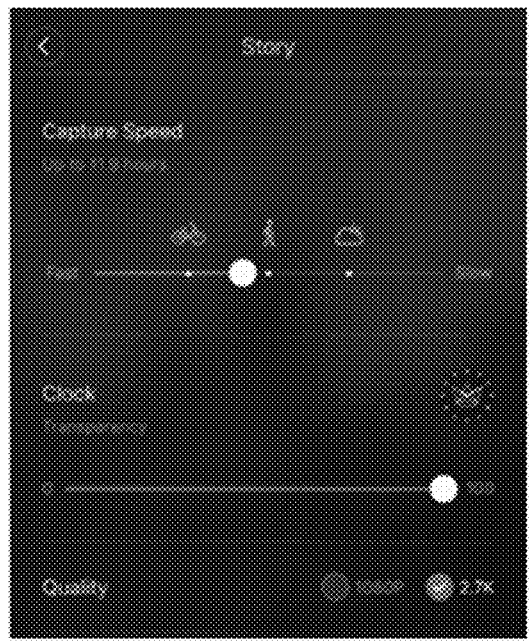
FIG. 34C is another example of a user interface similar to that shown in FIG. 34B.

FIG. 33 illustrates one example of a method for recording a time-lapse video journal using any of the apparatuses ads described herein. For example, a method of recording a time-lapse video diary may include activating a story mode of a wearable video capture apparatus worn by a user 3301. For example, presenting a user interface such as shown in FIG. 34A, and allowing the user to select the story mode of operation. The user may select (in a user interface such as shown in FIGS. 34B and 34C) a user-selected image capture interval 3303 and/or resolution (form a continuously selectable range or predetermined values), and/or the transparency of a time-stamp on the images of the video stream 3305. The apparatus may then automatically record images at the image capture interval to form a video stream (e.g., the selected rate) 3307. The apparatus may automatically reject images from the video stream based on: one or more indicators of image quality and/or on sensed motion 3309. For example, the one or more indicators of image quality may be, e.g., blurriness, light/color balance, sharpness, saturation, etc. Images may be removed from the video stream, or may be rejected prior to putting into the video stream. The method may also include storing and/or transmitting the video stream 3311 (e.g. using the wearable device). Finally, any of these methods may include editing the video stream to remove one or more images 3313. Editing may be done on the wearable device or using a second device (e.g., a phone or table wirelessly or directly connected to the wearable apparatus). This is illustrated into FIG. 35A-35B.

Figure 35A:
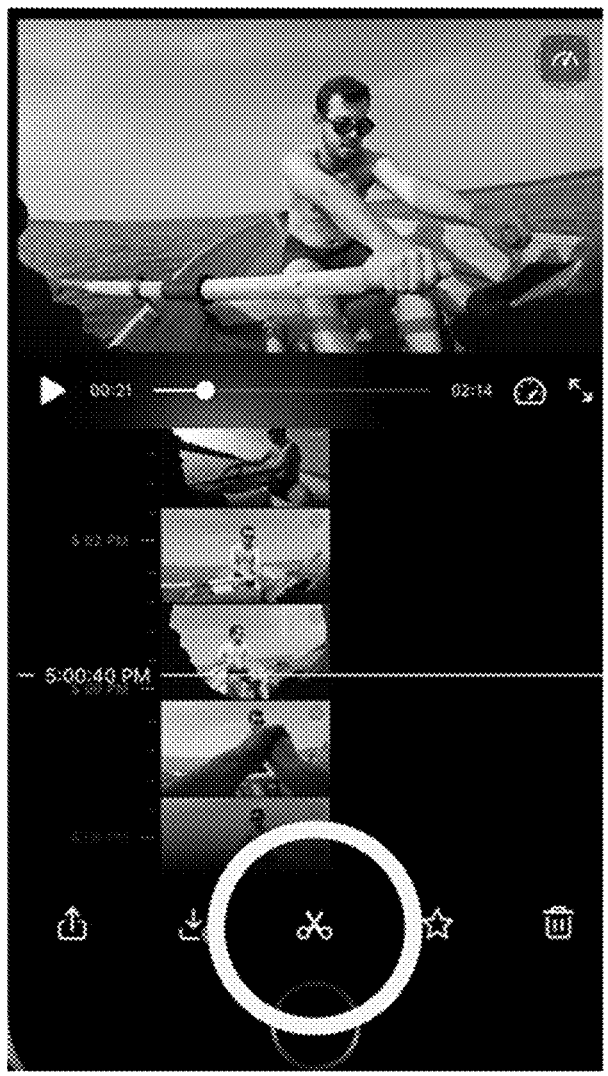
FIG. 35A illustrates an example of a user interface for editing a video stream.
Figure 35B:
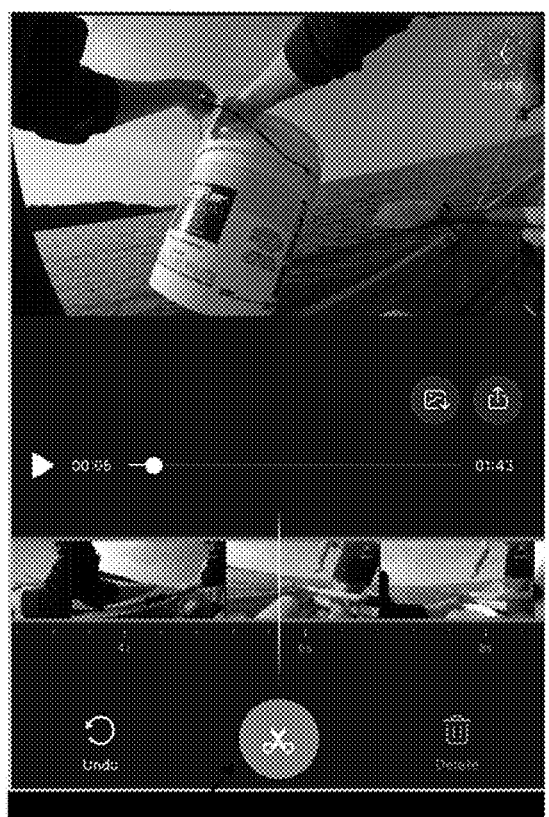
FIG. 35B is another example of a user interface for editing (e.g., cutting one or more images from) a video stream and/or capturing individual images from the stream.

For example in FIG. 35A, a user interface for editing a video stream ("video diary") is shown. In FIG. 35A, the video stream is shown in the top, with sequentially ordered (time-ordered) running down or across the screen. Tools (cutting, marking, exporting, removing individual frames, etc.) are shown in the bottom. For example, FIG. 35B shows the operation of the cutting tool 3505 is illustrated, allowing selection of a range of images from the video stream, and then allowing the group of selected image to be removed from the video stream. As mentioned, this may be done on the screen/display of the wearable device.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A video recording and streaming device, the device comprising:
   a tear-shaped body having a rounded front side and a back side, wherein the front side is separated from the back side by a curving sidewall;
   a rounded touchscreen on the front side of the tear-shaped body;
   a video camera mounted to front side of the tear-shaped body;
   an attachment portion configured to attach to a mount;
   wherein the device is configured to be held by a mount;
   a first buffer configured as a virtual frame buffer for converting rectangular display images from the video camera to the rounded touchscreen;
   a second buffer configured to communicate with one or more remote devices; and
   control circuitry configured to simultaneously display the converted display images on the rounded touchscreen and to transmit mirrored images of the display images to the one or more remote devices.

2. The device of claim 1, further comprising one or more buttons on the device configured to start live streaming of images from the video camera for display on the rounded touchscreen.

3. The device of claim 1, further comprising a releasable fastener on the tear-shaped body securing the attachment portion to the mount.

4. The device of claim 3, wherein the releasable fastener comprises a hybrid mechanical and magnetic fastener.

5. The device of claim 1, wherein the remote device is a smartphone.

6. The device of claim 1, wherein the attachment portion includes a channel or opening configured to accommodate a lanyard therethrough, wherein the channel or opening is substantially parallel to the front side or the back side of the device so that the front side or the back side of the device can be worn against a user's body.

7. The device of claim 1, further comprising control circuitry configured to receive video input locally from the touchscreen and video camera, and to receive control and video input remotely from a second device.

8. A video recording and streaming device, the device comprising:
 a tear-shaped body having a rounded front side and a back side, wherein the front side is separated from the back side by a sidewall;
 a rounded touchscreen on the front side of the tear-shaped body;
 a video camera mounted to front side of the tear-shaped body;
 an attachment portion configured to attach to a mount;
 a first buffer configured as a virtual frame buffer for converting rectangular display images from the video camera to the rounded touchscreen;
 a second buffer configured to communicate with one or more remote devices; and
 control circuitry configured to simultaneously display the converted display images on the rounded touchscreen and to transmit mirrored images of the display images to the one or more remote devices.

9. A video recording and streaming device, the device comprising:
 a tear-shaped body having a rounded front side and a back side, wherein the front side is separated from the back side by a sidewall;
 a rounded touchscreen on the front side of the tear-shaped body;
 a video camera mounted to an upper portion of the front side of the tear-shaped body;
 an upper attachment portion to which a lanyard is attached;
 a fastener on the body configured to secure the attachment portion to the tear-shaped body;
 a release control configured to be actuated to release the fastener
 wherein the device is configured to be worn by placing the lanyard around a user's neck;
 a first buffer configured as a virtual frame buffer for converting rectangular display images from the video camera to the rounded touchscreen;
 a second buffer configured to communicate with one or more remote devices; and
 control circuitry configured to simultaneously display the converted display images on the rounded touchscreen and to transmit mirrored images of the display images to the one or more remote devices.

* * * * *